United States Patent
Schneider

(10) Patent No.: US 10,835,034 B2
(45) Date of Patent: Nov. 17, 2020

(54) MODULAR PORTABLE TABLE

(71) Applicant: Fredericus (Fritz) Keith Schneider, Franklin, TN (US)

(72) Inventor: Fredericus (Fritz) Keith Schneider, Franklin, TN (US)

(*) Notice: Subject to any disclaimer, the term of this patent is extended or adjusted under 35 U.S.C. 154(b) by 0 days.

(21) Appl. No.: 15/849,142

(22) Filed: Dec. 20, 2017

(65) Prior Publication Data

US 2018/0110329 A1   Apr. 26, 2018

Related U.S. Application Data

(63) Continuation of application No. 14/989,775, filed on Jan. 6, 2016, now abandoned.

(60) Provisional application No. 62/100,518, filed on Jan. 7, 2015, provisional application No. 62/104,922, filed on Jan. 19, 2015.

(51) Int. Cl.
| | |
|---|---|
| *A47B 23/00* | (2006.01) |
| *A47B 37/04* | (2006.01) |
| *B60N 3/00* | (2006.01) |
| *A47B 3/10* | (2006.01) |
| *A47B 3/06* | (2006.01) |
| *A47B 13/02* | (2006.01) |

(52) U.S. Cl.
CPC ............. *A47B 37/04* (2013.01); *A47B 3/06* (2013.01); *A47B 3/10* (2013.01); *A47B 13/023* (2013.01); *B60N 3/001* (2013.01); *A47B 2013/024* (2013.01)

(58) Field of Classification Search
CPC ............ A47B 13/023; A47B 2013/024; A47B 2013/025

USPC ............................................. 108/150, 6, 8
See application file for complete search history.

(56) References Cited

U.S. PATENT DOCUMENTS

| | | | | |
|---|---|---|---|---|
| 3,119,588 A * | 1/1964 | Keats | ............ | G09F 17/00 248/158 |
| 3,368,858 A * | 2/1968 | Motter | ............ | A47B 19/06 312/249.3 |
| 4,086,859 A * | 5/1978 | Dondero | ............ | A47B 11/00 108/142 |
| 4,448,378 A * | 5/1984 | Binfare | ............ | A47B 13/023 108/150 |
| 4,497,077 A * | 2/1985 | Provost | ............ | A47K 1/02 248/156 |
| 4,907,778 A * | 3/1990 | Rockwell | ............ | B23D 63/003 24/327 |
| 5,161,561 A * | 11/1992 | Jamieson | ............ | A45B 3/00 108/94 |
| 6,205,935 B1 * | 3/2001 | Lindaman | ............ | A01M 31/02 108/152 |
| 6,945,502 B2 * | 9/2005 | Restifo | ............ | A45F 3/44 248/146 |
| 7,077,366 B2 * | 7/2006 | Young | ............ | G03B 37/02 248/156 |
| 7,229,130 B1 * | 6/2007 | Holly | ............ | B60R 9/06 108/44 |
| 2002/0020655 A1 * | 2/2002 | McKsymick | ............ | A47B 21/00 206/738 |

(Continued)

*Primary Examiner* — Matthew W Ing
(74) *Attorney, Agent, or Firm* — Eric B. Fugett; Mark A. Pitchford; Pitchford Fugett, PLLC

(57) ABSTRACT

A modular portable table includes a tabletop, one or more leg assemblies, and an anchor assembly for securing the table to a substrate, the one or more leg assemblies positioned between the tabletop and the anchor assembly.

2 Claims, 26 Drawing Sheets

(56) References Cited

U.S. PATENT DOCUMENTS

| | | | | |
|---|---|---|---|---|
| 2005/0023428 A1* | 2/2005 | Woude | ............... | E04H 12/2246 |
| | | | | 248/530 |
| 2005/0178300 A1* | 8/2005 | Garfunkle | ............ | A47B 13/023 |
| | | | | 108/150 |
| 2014/0182488 A1* | 7/2014 | Lu | .......................... | A47B 27/16 |
| | | | | 108/6 |

\* cited by examiner

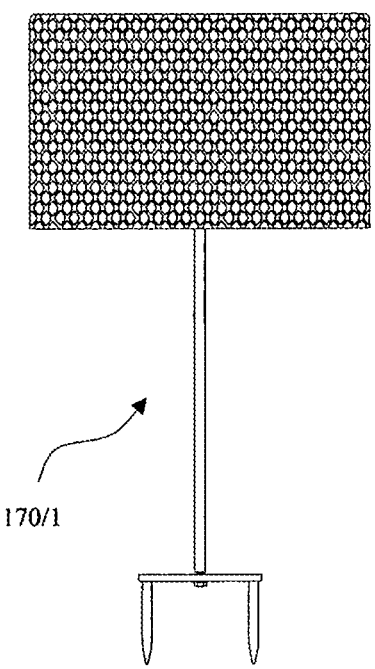
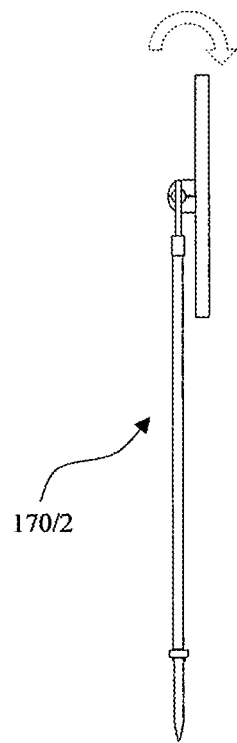
FIG 7
FIG 8

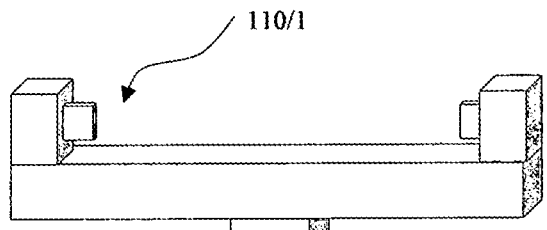
FIG 38
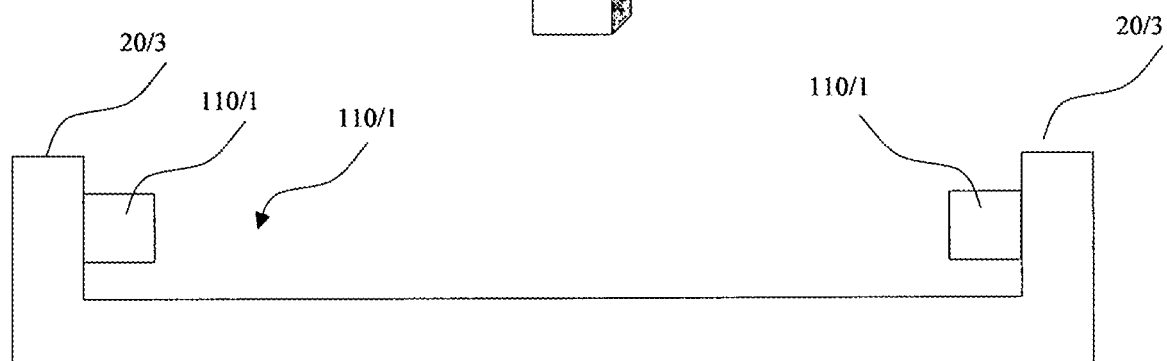
FIG 39
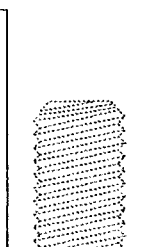
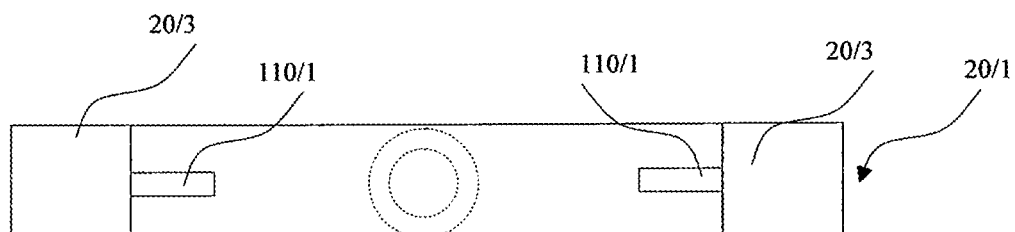
FIG 40
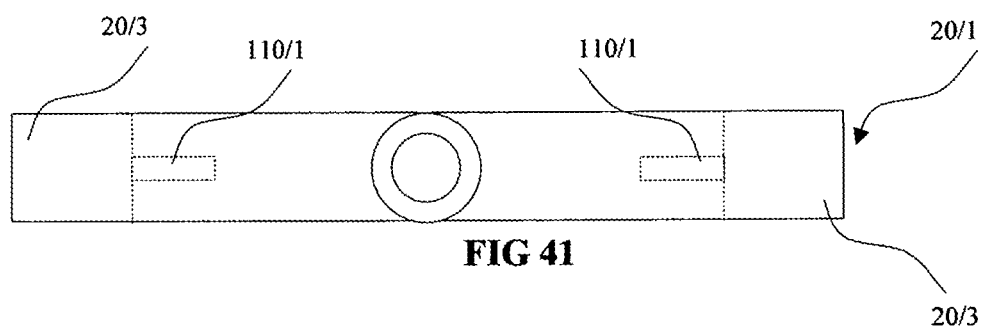
FIG 41

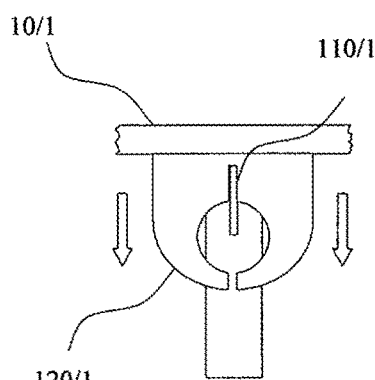
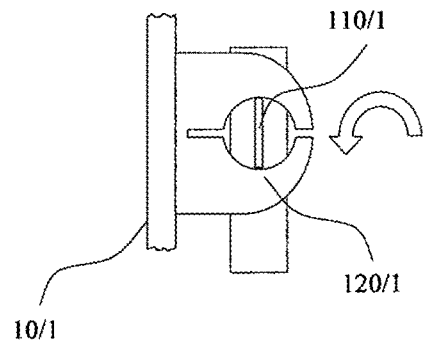
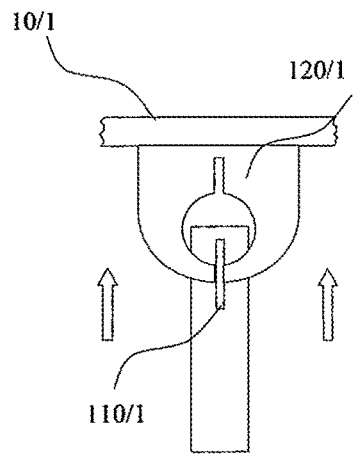
FIG 42            FIG 43            FIG 44
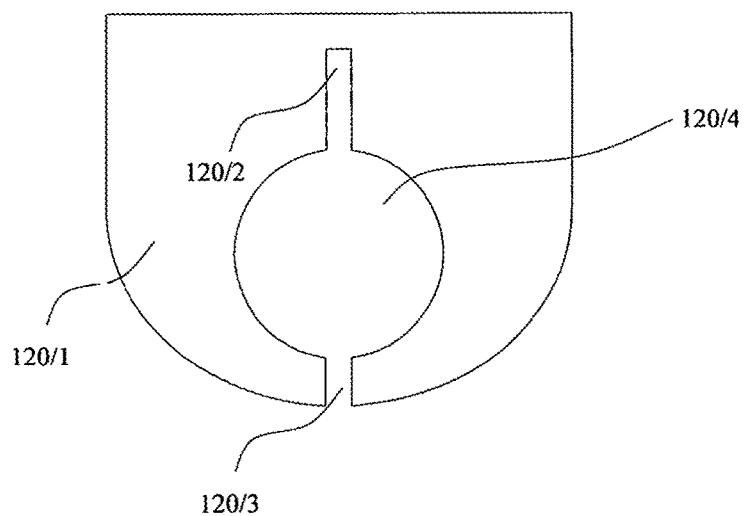
FIG 45

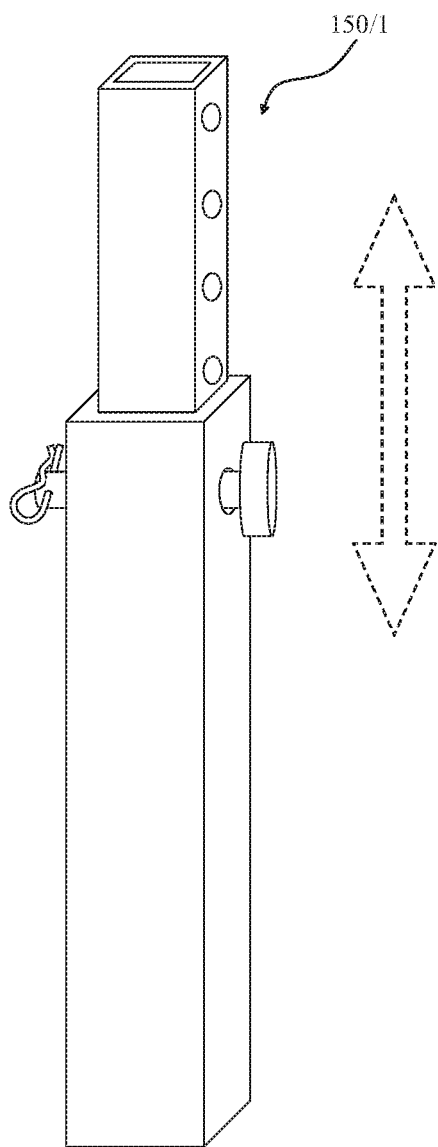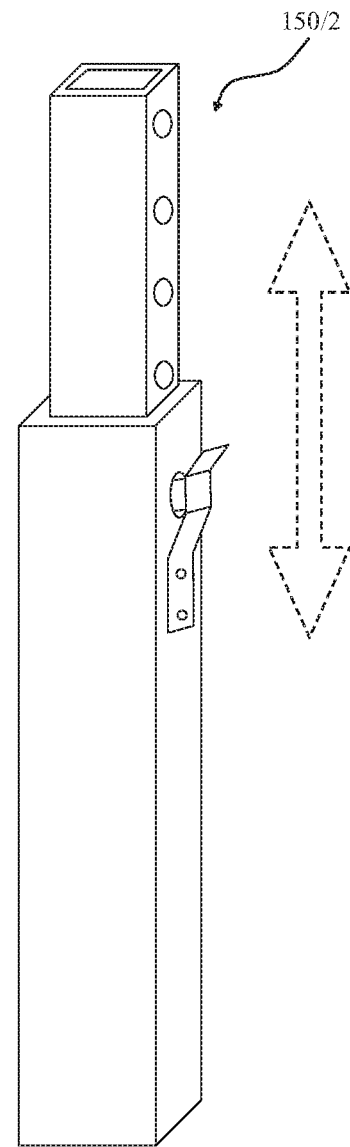
FIG 52                    FIG 53

MODULAR PORTABLE TABLE

CROSS-REFERENCES TO RELATED APPLICATIONS

This application is a continuation of U.S. patent application Ser. No. 14/989,775 filed Jan. 6, 2016 entitled "MODULAR PORTABLE TABLE", which is a non-provisional of U.S. Patent Application No. 62/100,518 filed Jan. 7, 2015 entitled "MODULAR PORTABLE TABLE", and is a non-provisional of U.S. Patent Application Ser. No. 62/104,922 filed Jan. 19, 2015 entitled "MODULAR PORTABLE TABLE", all of which are herein incorporated by reference in their entirety.

TECHNICAL FIELD

The present disclosure relates to portable tables. More particularly, the disclosure relates to lightweight, compact, modular, portable tables configured to provide a flat, dry surface in any terrain or ground conditions.

BACKGROUND

Interest in outdoor activities is growing. Every year, more and more people spend time outdoors participating in a wide variety of work and leisure activities, including hiking, camping, hunting, fishing, picnicking, reading, sunbathing, yard games, and the like. Many people enjoy outdoor activities throughout all four seasons and in all types of weather, terrain and ground conditions. However, the lack of readily available clean, dry, and convenient flat surfaces often limits the types of equipment a person may bring with them.

Surveys have shown that the most often requested item by outdoor enthusiasts is a table. Virtually everyone has a need to use, stow and protect one or more items used in a given outdoor activity (e.g., binoculars for bird watching or books for reading). Many people also desire to use additional unnecessary but preferred items in order to make the outdoor experience more enjoyable (e.g., range finders for golf or a beverage while playing yard games). Such items can be expensive, breakable and unsuited to be placed on wet, rough, or uneven surfaces, such as the ground.

Although many urban parks and campsites are equipped with tables or benches, they are often un-sanitary, occupied and/or placed too far from the desired location of any given user. These tables also tend to be immovable as they are typically either permanently mounted in one location or too large and cumbersome for any one person to move. Such tables are also generally dirty from prolonged exposure to the weather. As a result, many individuals are unable or unwilling to use them.

Traditional fixed-leg home dining and bench-style tables are similarly impractical for most outdoor applications due to their size and weight. Even currently available folding tables are unsuited for broad use across the gamut of terrain and ground conditions commonly encountered by outdoors enthusiasts. Such tables are too large to be easily carried and do not allow for use on un-even or slanted terrain because items placed on the tabletop surface will simply slide off. Furthermore, these tables are not portable, packable, or made from interchangeable parts. Moreover, these tables lack versatility, as they do not allow users to modify or alter their configuration to suit a given user's needs, the terrain, or the ground conditions or environment in which it will be deployed.

Thus, there exists a need for an inexpensive, lightweight, modular portable table that is compact, easily stowed and assembled, and suitable for use in any environment and with any terrain and ground conditions.

SUMMARY

The disclosure relates to modular, portable table systems designed for indoor and outdoor use on all types or terrain and ground conditions, including flat, uneven, sloped, rough, and rugged terrain, and snow, water, ice, sand, mud, leaves, thick grass, rocks, trees and fence posts, and domestic grass.

In one aspect, a modular portable table comprises one or more tabletop sections, a T-bar support strut, an anchor assembly, and optionally, a leg assembly comprising one or more leg segments. In another aspect, a modular portable table comprises at least one tabletop section, a pair of hinges, a T-bar support strut, an anchor assembly, and optionally, a leg assembly comprising one or more leg segments. In certain embodiments, the anchor assembly is a ground spike assembly, a ground spike, a hard surface box assembly, or a tree screw. In another embodiment, the anchor assembly is a ball hitch adapter configured to attach to a receiver hitch of a vehicle. In certain embodiments, a portable modular table also comprises at least one additional support strut.

In some embodiments, the tabletop sections are separable mirror images of each other and are configured with perforations or other holes to prevent condensation from forming on the bottom of an item placed thereon. Segmentation of the tabletop sections provides increased portability, reduced bulk when disassembled, and allows each section to serve as a separate tabletop if desired.

The T-bar support strut attaches to the underside of each tabletop section to hold the two halves of the tabletop together. The T-bar can also function as a hook to hang or hold additional items such as clothes, glasses, hats, lanyards, or any other items that a user may desire to elevate off of the ground. The T-bar also connects to a leg assembly, or an anchor assembly.

The leg assembly comprises one or more interchangeable leg segments, which support the tabletop sections off of the ground. Each leg segment is configured with a male end and a female end, both of which are threaded with screw threads. The male end each leg segment can screw into the female end of every other leg segment. The male end of one leg segment can be screwed into a hole on the bottom of the T-bar. Additional leg segments may be connected to the female end of the first leg segment. In this way, a user may increase or decrease the height of the table by adding or removing leg segments in series as desired. The leg segments can also be used as a walking staff, a hunting spear or tool, a self-defense tool, a support strut for a shelter, a stint for broken bones, a cooking tool, a clothes line, or other device from which a user may hang items to elevate them from the ground.

A ground spike is a rod having a sharpened point at one end and screw threads at the opposite end configured to releasably engage with the female end of a leg segment. A ground spike assembly, in one embodiment, comprises a cross bar, one or more ground spikes, and a retaining screw for connecting the ground spike assembly to a leg segment or T-bar. The threaded ends of the one or more ground spikes are releasably screwed into threaded receiver holes at either end of the cross bar. The retainer screw is then passed through the central hole in the middle of the cross bar and releasable engaged to the threaded female end of the lowermost leg segment or the threaded hole in the center of the T-bar. The ground spike assembly is designed to secure the table system to the ground or substrate that the table is deployed on. It can be used as a single spike (pole style) or as a double spike (fork style) to suit the relevant terrain or ground conditions. Each spike can also be used as a hunting spear point or tool, a spike in walking staff to aid walking in icy conditions, a self-defense tool, a tool for holding food during cooking, a tool for holding down a tarp or other shelter covering.

A hard surface box and lid assembly is a dual-purpose carry case and anchor or weight apparatus for anchoring the assembled table system to the ground when the terrain or ground conditions make use of a ground spike assembly inappropriate (e.g., on frozen ground, solid rock, concrete, or a tent floor). The box assembly allows the table system to be deployed indoors or on hard flat surfaces. When not in use, the box assembly may be used as a carry case for the other components of the disassembled table system.

A tree screw is a member having a sharp pointed end and an opposite blunt end. The sharp end is configured with self-tapping screw threads designed to facilitate attachment of the table system to a tree or wooden post. The blunt end is configured with screw threads complimentary to those of the threaded central hole in the bottom of the T-bar and the threaded female end of a leg assembly segment. The tree screw enables the table to be deployed in environments where the terrain or ground conditions otherwise prevent use of the hard surface box assembly or ground spikes.

The table systems disclosed herein allow users to deploy a flat, dry table surface virtually anywhere. The tabletop sections are made of a lightweight material that allows for a strong flat surface to stow and keep personal items dry and safe. It is a multi-functional product that serves a wide range of users across an even broader range of activities. Some of the applications in which the table system is useful include fishing, hunting, gardening, beach activities, yard games, plant stand, camping, hiking, drying rack, food storage and preparation, appliance stand, eating, pet training, reading, gaming, tail-gating (with ball hitch adapter), and the like. The table system disclosed herein is affordable, portable, modular, adjustable, and multi-purpose. It is suitable for use by persons of all ages and physical capabilities. The components of the table system are also individually replaceable such that if a any single part is broken or lost, a user may simply replace it with an interchangeable component without having to purchase an entire new table system.

These and other aspects and advantages of the invention described herein will be better understood and appreciated by those skilled in the art by reference to the accompanying drawings briefly described below in conjunction with the following detailed description, wherein certain preferred embodiments including the best mode are described. It is to be understood that the specific devices and processes illustrated in the attached drawings and described in the following detailed description are exemplary embodiments of the inventive concepts defined in the claims below. Hence, specific dimensions and other physical characteristics relating to the embodiments disclosed herein are to be regarded as illustrative in nature and not as restrictive, unless the claims expressly state otherwise.

BRIEF DESCRIPTION OF THE DRAWINGS

FIG. 7 illustrates the components and assembly of a flip-top portable table (front view with table top folded down).

FIG. 8 illustrates the components and assembly of a flip-top portable table (side view with table top folded down).

FIG. 38 illustrates perspective view of an embodiment of a T-bar for a flip-top and portable table disclosed herein.

FIG. 39 illustrates design option of an embodiment of a T-bar for a flip-top and portable table disclosed herein.

FIG. 40 illustrates design option of an embodiment of a T-bar for a flip-top and portable table disclosed herein (top view).

FIG. 41 illustrates design option of an embodiment of a T-bar for a flip-top and portable table disclosed herein (bottom view).

FIG. 42 illustrates design options for a hinge assembly for a flip-top portable table disclosed herein (locked position).

FIG. 43 illustrates design options for a hinge assembly for a flip-top portable table disclosed herein (folded position).

FIG. 44 illustrates design options for a hinge assembly for a flip-top portable table disclosed herein (remove table top).

FIG. 45 illustrates design options for a hinge assembly for a flip-top portable table disclosed herein (slot for t-bar).

FIG. 52 illustrates another embodiment of a leg assembly for adjusting the height of a solid top and flip top portable table disclosed herein using pin.

FIG. 53 illustrates another embodiment of a leg assembly for adjusting the height of a solid top and flip top portable table disclosed herein using pull tab.

DETAILED DESCRIPTION

Figure 1:
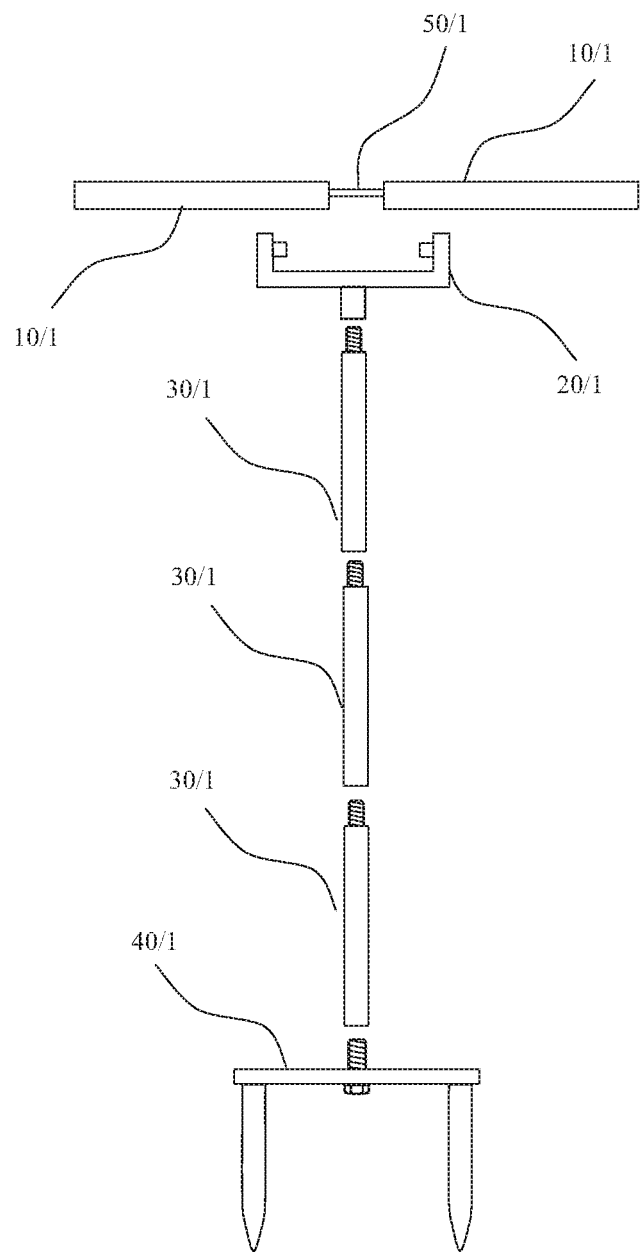
FIG. 1 illustrates the components and assembly of a solid-top portable table.

Turning now to FIG. 1, a partially exploded view of the solid-top table with ground spike assembly. The table surface is formed from two tabletop sections 10/1, which are mirror images of each other. In some embodiments, the tabletop sections 10/1 are made from aluminum. In other embodiments, the tabletop sections are made from carbon fiber, plastics, other metals including alloys, or combinations thereof. The two tabletop sections 10/1 are joined together using the T-bar 20/1 and the support struts 50/1 to the sections aligned and connected. The two upwardly extending fingers of the T-Bar 20/1 are then inserted into two holes (not shown), one on the underside of each tabletop section 10/1. The T-Bar 20/1 connects the two tabletop sections 10/1 and prevents them from separating during use. The T-Bar also provides the stability necessary to keep the tabletop from tipping once assembled, positioned, and loaded with items. The T-Bar 20/1 comprises a threaded hole on the underside that can be connected to one of the leg assembly segments 30/1, or directly to a ground spike or ground spike assembly 40/1. In addition to supporting the tabletop sections 10/1, the T-bar 20/1 can also serve as a hook for hanging items, a rack for dry shoes and boots, and a multipurpose camp tool. The use of two tabletop sections 10/1 to form the complete table surface permits a user to deploy each tabletop section 10/1 separately, as a smaller table surface for two separate tables.

The leg segments 30/1 are identical in shape and size and each is configured with the same screw threads to facilitate modularity. Each leg segment 30/1 has a male end and a female end, both of which are configured with screw threads so that the male end of one leg segment may be screwed into the female end of another leg segment. Any number of leg segments 30/1 may be used between the T-bar 20/1 and chosen anchor assembly to control the height of the table surface. The male end of the uppermost leg segment 30/1 is screwed into the hole in the underside of the T-bar 20/1. The leg assembly segments 30/1 are made out of aluminum, but can be made out other lightweight and durable materials. For example, the leg assembly segments 30/1 can be cast from a mold or machined from a solid bar of metal by a CNC machine. Leg assembly pieces may be round or square in cross section, as well as solid or hollow. The use of round leg assembly pieces allows the user to screw each piece into another while ensuring that each piece lines up perfectly with the next piece regardless of how tightly the two connecting pieces are connected, unlike a square tube where the threads have to be carefully aligned to keep all four sides of the tube flush. The leg assembly segments 30/1 can also be used as a walking stick, hunting or fishing spear, self-defense tool, tent pole, stint, or a stake.

Ground spikes 40/1 can be inserted into a variety of substrates to help the table to stand upright. Ground spikes can be used individually (pole style) or in pairs (fork style). The substrate to which the table is anchored will dictate what style of ground spike assembly is most suitable for keeping the table vertical. The lower rightmost illustration shows the relationship between the male and female thread components. The configuration of the ground spike portion of the ground spike assembly may be modified to suit the intended application of the table. For example, the shape of the points may be changed to suit the expected ground conditions. Alternatively, a single solid bar bent and sharpened on both ends to form the spikes may be used instead of having each spike thread into a cross bar. Additionally, the retaining bolt that attaches the ground spike assembly 40/1 to the leg assembly 30/1 or the T-bar 20/1 could be fixed and not removable. The spikes and bolts can also be welded onto the cross bar to form the ground spike assembly 40/1. In other embodiments, the ground spikes may be configured with serrations, barbs, or other textural features to prevent them from being pulled out of the ground or other substrate into which they are anchored. The ground spike assembly works with any substrate soft enough to allow a user to push the spike(s) into the ground, and is therefore ideal on uneven and slanted surfaces.

In one embodiment, the tabletop sections 10/1 comprise square holes on the underside of each half. In other embodiments, the holes are round. In such embodiments, the fingers of the T-bar 20/1 are shaped so as to correlate to the shape of the holes in the tabletop sections 10/1 and thus fit snugly therein. The T-bar may be manufactured from a straight bar that is bent to form the upwardly extending fingers that fit into the holes on the bottom sides of the tabletop sections 10/1. Another option for modification on the T-bar for the flip-top embodiment is to make it the same as the T-bar for the solid-top embodiment but to further include a tab 110/1 for a hinge. (See FIG. 16).

Threads are used on the individual components of the portable table system to make the table modular. The threads all work in conjunction to allow the end user to interchange the pieces and adapt to any terrain, environment, or ground conditions. The thread design allows for a secure connection between the component pieces, making the portable table system strong and durable. The number and size of threads that are used in the manufacturing of the table components insures that the pieces will not come apart even if they are loosened. The threaded design of the component pieces is one of the key reasons that the portable table system disclosed herein is so stable, reliable and durable. The threading on the various threaded components of the table system may be adapted to employ any suitable unified thread count, number of threads per inch, metric or American threads, reverse or standard threads, or cast or turned threads. In some embodiments, the threads may be eliminated altogether and a push button system used, for example, as shown in FIGS. 52 and 53. The various components of the table system may instead be attached to one another using clamps.

The hard surface (See FIG. 33) box and lid assembly supports the portable table system on hard or flat surfaces where the ground spike assembly 40/1 will not penetrate the substrate. The box assembly adds minimally to the overall weight of the portable table system because the box and lid is hollow and functions as a case for the various other components of the portable table system. For this reason, the user does not have to carry additional unnecessary weight or bulk to use the box. An assembled portable table attached to a hard surface box and lid assembly can be made even more stable by placing various materials readily found in nature or urban environments into the box assembly to weight it down. Suitable materials include, for example, water, rocks, sand, dirt, and mud. No extra weighted objects need be packed or carried by the user. The hard surface box and lid assembly can be used indoors, in a tent, in a truck bed, on hard surfaces, and as a strongbox or storage container for important or perishable items such as food, tools, medical supplies, fire wood, and the like. The hard surface box and lid assembly may vary in dimensions, wall thickness, lip configuration, and constituent material(s) to suit the intended application or manufacturing process for the remainder of the table components.

The portable table systems disclosed herein offer many benefits over other tables on the market today, including increased portability, strength, and durability, lighter weight, easier deployment and relocation, and no breakable moving parts. Each of the components of the table systems disclosed herein are designed to be individually replaced if broken or lost to prevent a user from having to purchase an entire new portable table system should one piece be lost or broken. In preferred embodiments, there are no welds on any of the components of the portable table system. The lack of welds makes each piece stronger and more reliable, and thus less likely to fail under stress. In other embodiments, the table system may comprise one or more welded parts. The components of the table systems disclosed herein can be cast from a mold or machined from a given substrate material such as aluminum using a CNC machine or sand cores. Because many of the individual components of the table systems are identical, the tooling necessary to manufacture a table system of the present disclosure is minimized. For example, the tabletop sections 10/1 can be cast from one mold.

Figure 2:
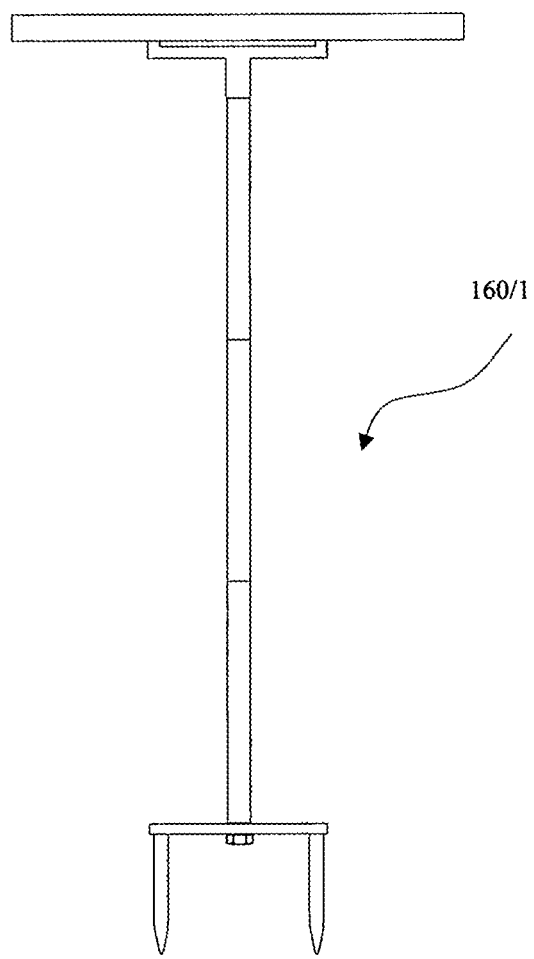
FIG. 2 illustrates assembled view of solid-top table.

FIG. 2, there is illustrated the same solid-top portable table with ground spikes shown in a front plan view (160/1).

Figure 3:
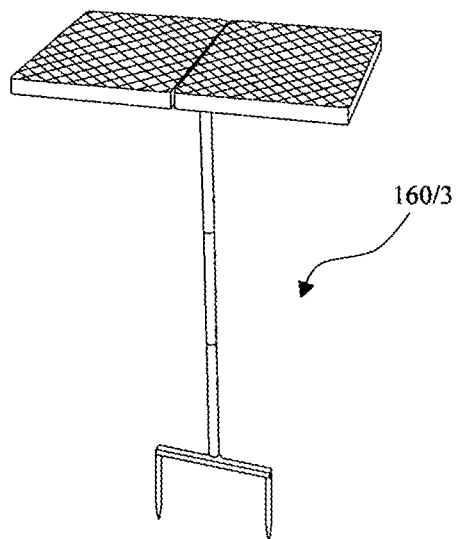
FIG. 3 illustrates a perspective view of a solid-top table connected to a hard surface box and lid assembly.

FIG. 3, there is shown a perspective view of an assembled solid-top portable table having a stationary or fixed tabletop and ground spike assembly (160/3).

Figure 4:
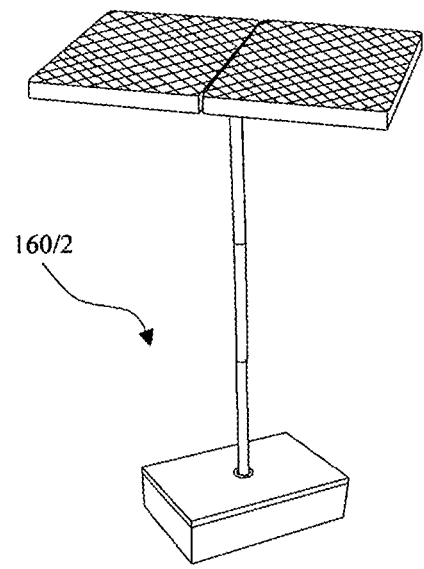
FIG. 4 illustrates a perspective view of a solid-top table connected to a ground spike assembly.

FIG. 4, image labeled 160/2 shows a perspective view of the table system using a hard surface box and lid assembly as an anchor instead of a ground spike assembly.

Figure 5:
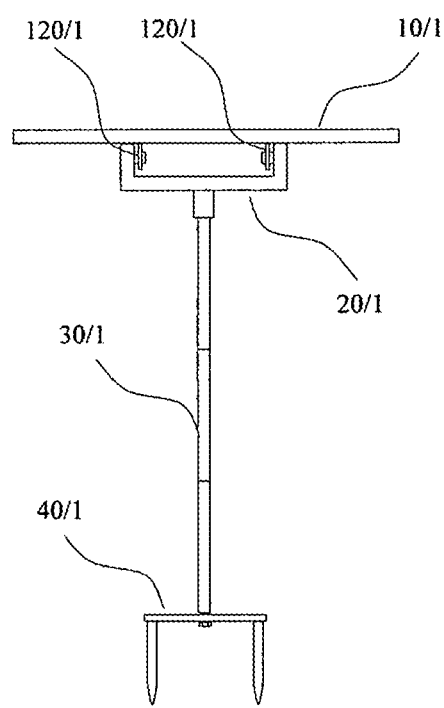
FIG. 5 illustrates the components and assembly of a flip-top portable table (front view).

FIG. 5, there is illustrated a plan front view of the flip-top portable rotatable table. The surface of a flip-top table 10/1 may comprise a single large tabletop section, or two mirrored tabletop sections. In either case, the ends of the tabletop 10/1 section are locked into proprietary hinges 120/1 located on the under side of the Flip Table Top 10/1. This allows the assembled tabletop to flip down. When the tabletop is in the flat or deployed position, the tabs on either side of the T-Bar 20/1 will lock into place in the hinges 120/1. In this embodiment, the T-bar 20/1 holds the tabletop section(s) while allowing it to be swiveled from a flat, deployed position to a folded, stowed position. The hinges 120/1 also provides the stability necessary to keep the tabletop from tipping when deployed and loaded with items. The primary difference between the portable rotatable flip-top table and the stationary or solid-top table is the hinge mechanism 120/1 located under the flip-table top, which contains no moving parts. The lack of moving parts minimizes the chance of breakage. Other forms of a movable part or joint known to those skilled in the art may also be used.

Figure 6:
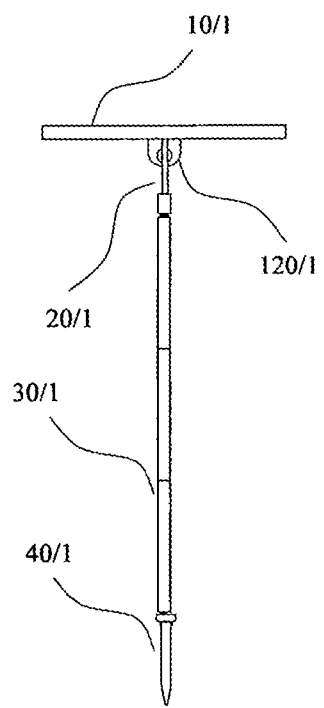
FIG. 6 illustrates the components and assembly of a flip-top portable table (side view).

FIG. 6, there is illustrated a plan side view of the flip-top portable rotatable table. The surface of a flip-top table 10/1 may comprise a single large tabletop section, or two mirrored tabletop sections. In either case, the ends of the tabletop 10/1 section are locked into proprietary hinges 120/1 located on the under side of the Flip Table Top 10/1. This allows the assembled tabletop to flip down. When the tabletop is in the flat or deployed position, the tabs on either side of the T-Bar 20/1 will lock into place in the hinges 120/1. In this embodiment, the T-bar 20/1 holds the tabletop section(s) while allowing it to be swiveled from a flat, deployed position to a folded, stowed position. The hinges 120/1 also provides the stability necessary to keep the tabletop from tipping when deployed and loaded with items. The primary difference between the portable rotatable flip-top table and the stationary or solid-top table is the hinge mechanism 120/1 located under the flip-table top, which contains no moving parts. The lack of moving parts minimizes the chance of breakage. Other forms of a movable part or joint known to those skilled in the art may also be used. The portable flip-top table offers additional benefits over the stationary or fixed top table system, including a more space-saving design, and allowing the user to use the flip top tabletop as a windbreak or heat reflector.

FIG. 7, there is illustrated a view of a portable rotatable flip-top table system front views 170/1.

FIG. 8, there is illustrated a view of a portable rotatable flip-top table system side view 170/2.

Figure 9:
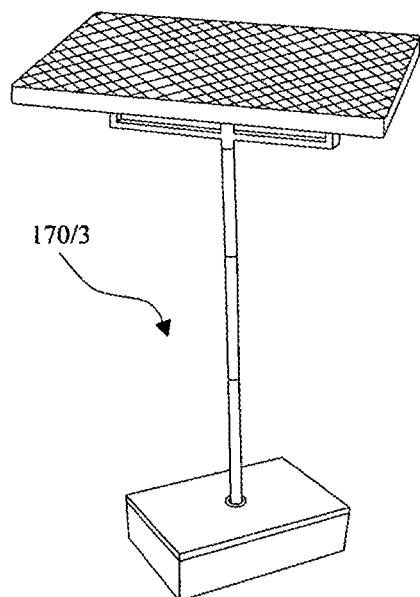
FIG. 9 illustrates a perspective view of the flip-top table connected to a hard surface box and lid assembly.

FIG. 9, image labeled 170/3 shows a perspective view of the flip-top table system using a hard surface box and lid assembly as an anchor instead of a ground spike assembly.

Figure 10:
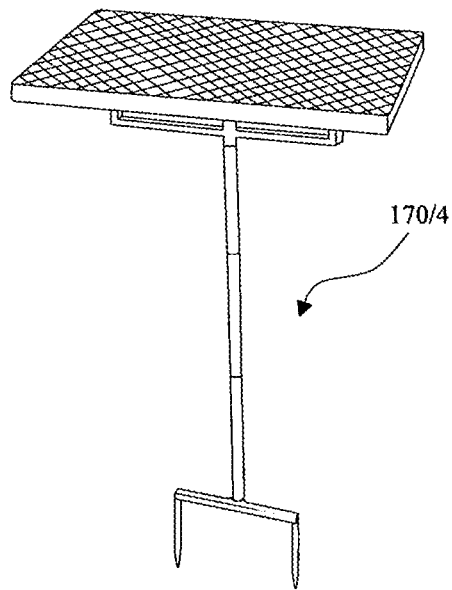
FIG. 10 illustrates a perspective view of the flip-top table connected to a ground spike assembly.

FIG. 10, there is shown a perspective view of an assembled flip-top portable table and ground spike assembly (170/4).

Figures 11, 12, 13, 14:
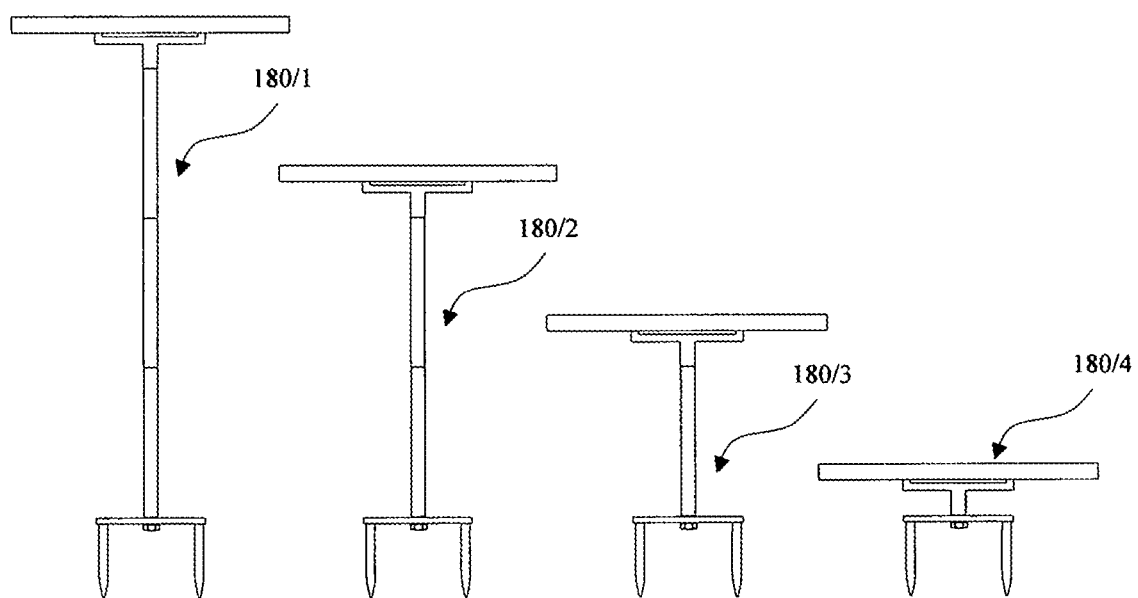
FIG. 11 illustrates different height options for a solid-top and flip top portable table having different numbers of leg segments (three leg assembly pieces).
FIG. 12 illustrates different height options for a solid-top and flip top portable table having different numbers of leg segments (two leg assembly pieces).
FIG. 13 illustrates different height options for a solid-top and flip top portable table having different numbers of leg segments (one leg assembly piece).
FIG. 14 illustrates different height options for a solid-top and flip top portable table having different numbers of leg segments (no leg assembly pieces).

FIG. 11, illustrates one of the various table heights that can be obtained by using three leg assembly pieces 180/1.

FIG. 12, illustrates another option for adjusting the table height. Two leg assembly pieces are illustrated 180/2.

FIG. 13, illustrates another option for adjusting the table height. One leg assembly piece is illustrated 180/3.

FIG. 14, illustrates another option for adjusting the table height. As is evident from image 180/4, the table system may be used without any of the leg pieces so that the ground spike assembly is connected directly to the T-bar. Because the leg assembly pieces are all identical, height of the tabletop can be adjusted by limiting the number of leg pieces that are used to assemble the table system. The fact that the leg pieces are all the same makes each piece interchangeable, keeps quality control high, and cuts down on manufacturing costs and time by facilitating manufacture of all leg segments using only one mold or CNC program. The ability to adjust the height of the tabletop provides increased convenience to users of all sizes and physical limitations. For example, the height of the table surface may be easily adjusted to standing or sitting height, or as necessary to keep items placed on the table surface away from ground-based pests.

Figure 15:
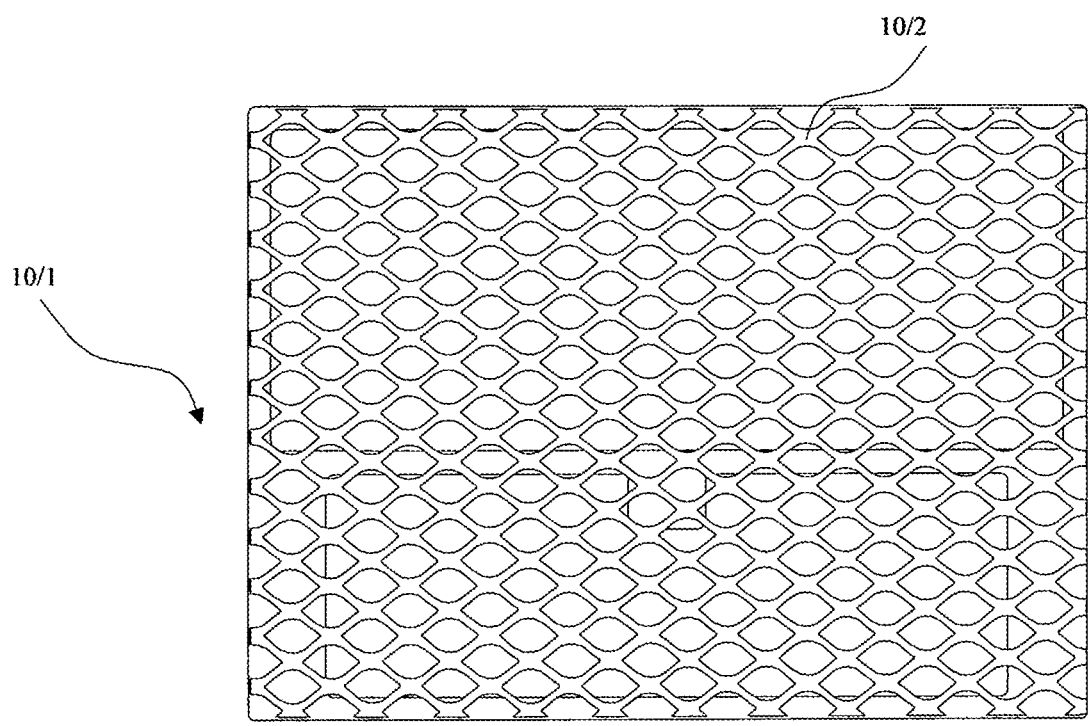
FIG. 15 illustrates design options for a tabletop section for the solid top and flip top portable tables disclosed herein (top view).

FIG. 15 illustrates one embodiment of a tabletop section. The table system is designed to use two mirrored tabletop sections 10/1 to form the full table surface and provide ample surface space for the user.

Each section of the tabletop 10/1 can also to be used alone as a smaller table surface for a separate table. This way, more than one person can have a flat dry surface. Each tabletop section is also designed with a perforated 10/2 surface to be permeable to weather conditions. For example, this allows moisture to pass through rather than collect on the table surface. This feature is also designed to keep moisture or condensation from forming on the underside of any items placed on the tabletop. Each half of the tabletop is a one-piece member that has no moving or working parts. This makes the tabletop sections very durable and virtually indestructible.

Each half of the tabletop can be used with or without the T-bar, leg assembly sections, or an anchor assembly. For example, the tabletop sections can be used as a cooking surface because the grate or grill-like surface is impervious to fire and thus allows for the heating or cooking of foods and water through each section. The tabletop sections can be removed from the T-bar by simply lifting them off of the T-bar without any loosening of any mechanical devices. This allows for the user to easily take the table from one place to another as a tray or carrying device. Additionally, the two tabletop sections can be used independently of each other, whether as cooking surfaces, trays, or separate table surfaces. This simple design insures an ergonomic, lightweight product that is strong and very reliable. The two pieces where purposely designed to mirror each other. The makes for easy use in the field. This was also done to substantially reduce the manufacturing costs and make the table system more affordable.

Figure 16:
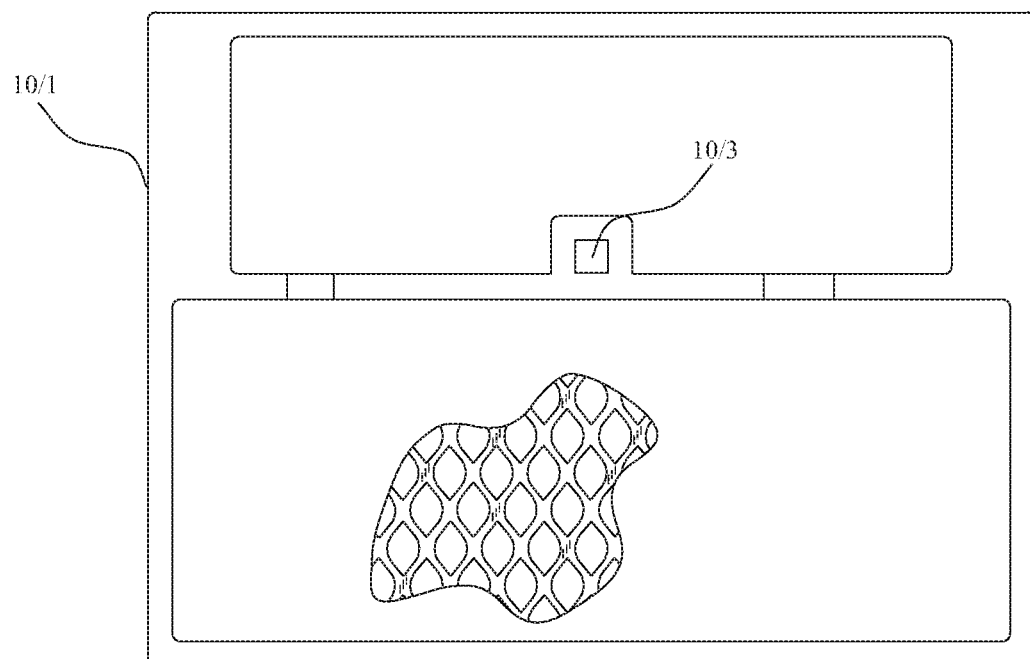
FIG. 16 illustrates design options for a tabletop section for the solid top and flip top portable tables disclosed herein (bottom view).

FIG. 16, illustrates a plan view of the bottom of a table section. The bottom of each tabletop section is configured with a hole 10/3 to receive one upwardly extending side arm of the T-bar 20/1 (not shown). The inside end of the tabletop segment designed to contact a second tabletop segment is configured with two holes 10/4 for receiving a rod-like support strut (see FIG. 17).

There is one receiver hole for a T-bar in the bottom side of each tabletop section. When the T-bar is inserted into these holes, the table surface is secure and will not come apart or tip. The tabletop sections can be removed from the T-bar by simply lifting each one upward. This allows for the user to move freely with the Table Top from one place to another without having to disassemble the entire table system. The T-bar can either be round or square and still work with the square receiver hole located on the bottom side of each of the two tabletop sections. This allows for quick and easy removal of the table surface making it portable and flexible. For example, a user may lift the tabletop sections off of the T-bar to take the table surface into a tent for the night. The remainder of the table system, including the T-bar, will remain standing by itself. In the morning, just lower the tabletop sections back onto the waiting T-bar.

Figure 17:
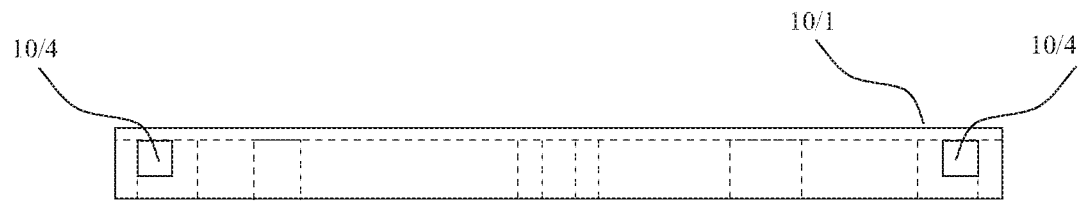
FIG. 17 illustrates design options for a tabletop section for the solid top and flip top portable tables disclosed herein (side view).

FIG. 17, illustrates where the support strut is inserted through the holes 10/4 in the ends of both tabletop 10/1 sections before the T-bar is inserted into the holes in the bottom surface of each tabletop section. The tabletop section shown is configured with square holes 10/4.

Figure 18:
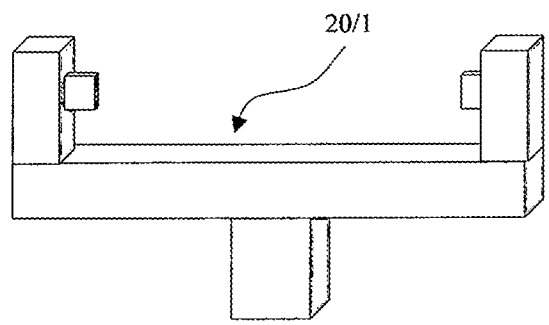
FIG. 18 illustrates perspective view options for a T-bar for solid top and flip top portable tables disclosed herein.

FIG. 18, illustrates a perspective view of one embodiment of a T-bar.

Figure 19:
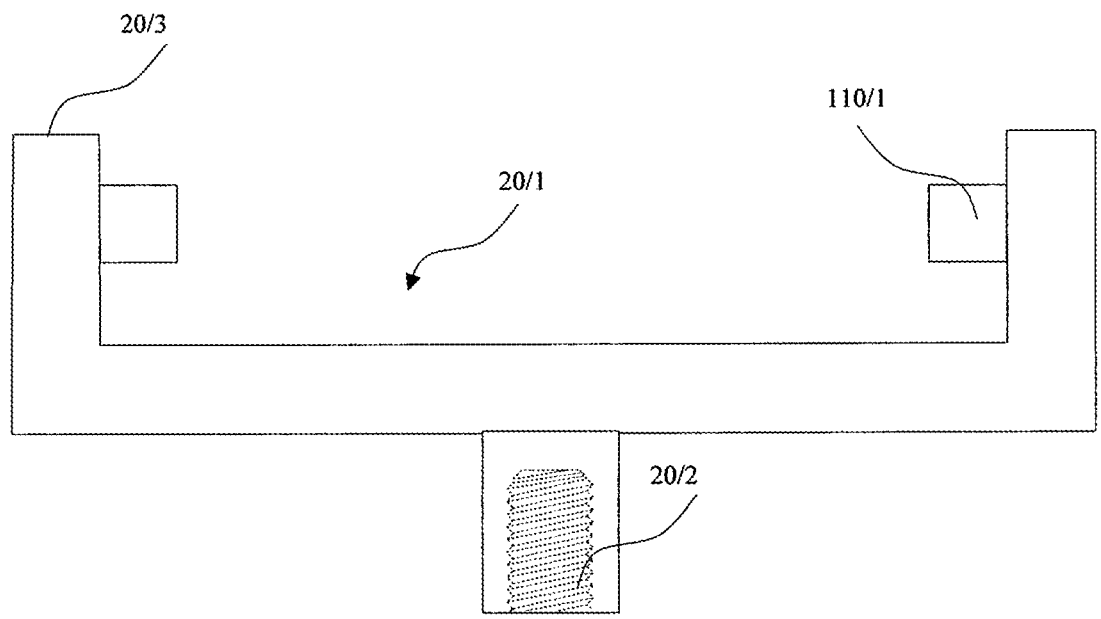
FIG. 19 illustrates design options for a T-bar for solid top and flip top portable tables disclosed herein.

FIG. 19, The T-bar depicted is suitable for use in a fixed, solid-top and the flip-top portable table system. The primary function of the T-bar 20/1 is to support both sections of the solid-top table surface and the flip-top rotating table. This is achieved by assembling the two tabletop sections on an internal rod-like support strut and setting the assembled unit on the two upwardly protruding arms of the T-Bar 20/3 such that the upwardly extending arms of the T-bar 20/3 fit into a hole on the underside of each tabletop section (not shown). The T-Bar is also responsible for keeping the two halves of the table surface from coming apart. This will keep the table from tipping and separating during use. Reference numeral 20/1 identifies the T-bar in its simplest form. Another embodiment of the T-bar suitable for use with the flip-top version of the table system disclosed herein is identified by referencing the tab on numeral 110/1. In either case, the T-Bar is designed to have multiple uses. The T-Bar can also be used as a hanging hook for a multitude of products including clothes, lanyards, hats and electronic devices, or as a hunting or multipurpose camp tool. As with the rest of the components in the T-ABLE System, the T-Bar is also constructed as a casted, one-piece component. The T-Bar is manufactured with a hole on the bottom (in the area identified by reference numeral 20/2) that is tapped with the corresponding female threads that will receive the male threads of a leg assembly segment or an anchor assembly. This joining concept is consistent throughout the design of the various components of the table systems disclosed herein, in that the threaded male ends of the various components are connectable to the threaded female portions of any other component.

Figure 20:
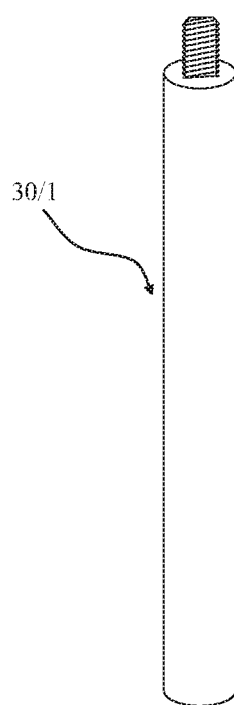
FIG. 20 illustrates perspective view of one end of a leg assembly segment for portable tables disclosed herein.

FIG. 20, provides a top perspective of one embodiment of a leg assembly piece 30/1.

Figure 21:
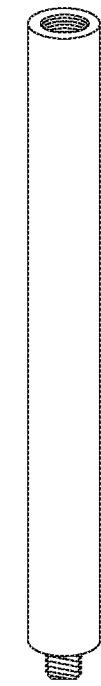
FIG. 21 illustrates perspective view of another end of a leg assembly segment for portable tables disclosed herein.

FIG. 21, provides a bottom perspective of one embodiment of a leg assembly piece 30/1.

Figure 22:
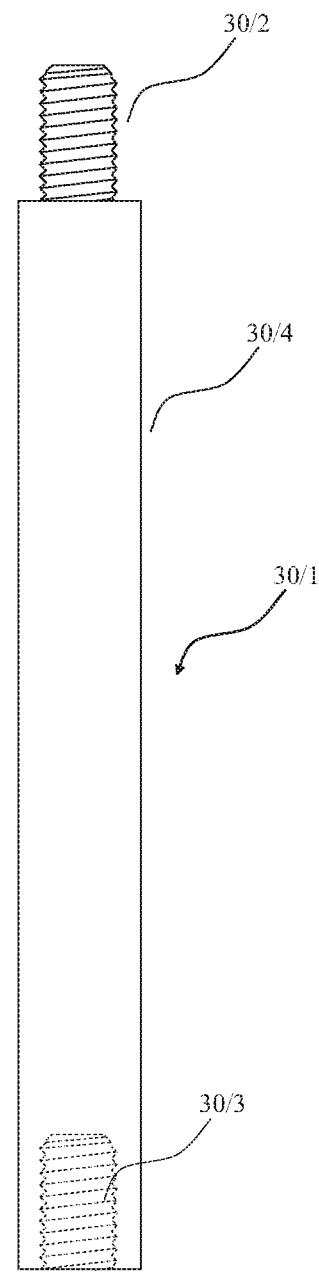
FIG. 22 illustrates design options of a leg assembly segment for portable tables disclosed herein.

FIG. 22, illustrates a plan view of one embodiment of a leg assembly segment 30/1. The segments of the leg assembly are designed to connect to each other, as well as a T-bar and an anchor assembly, which can be a ground spike, a ground spike assembly, a hard surface box and lid assembly, a tree screw or a ball hitch adapter (all not shown). Multiple leg segments can be connected in series to adjust the overall height of the table to a user's preference. Each leg segment is made out of a single piece of substrate material and comprises a male end 30/2 and a female end 30/3. In one embodiment, each male and female end is threaded with complimentary screw threads so that the male end screws into the female end. In another embodiment, the threads are Unified Thread Standard threads. Each leg segment is self-aligning, so than when connected and tightened under simple hand pressure, the segments appear to be one unitary leg. The threading used on the leg segments corresponds to the threading used in other components of the table system to allow the leg assembly segments to be fully connectable with other components. In one embodiment, the leg segments are made out of aluminum. Other suitable substrate materials will be known to the skilled artisan. Leg segments can be cast or machined out of a given substrate. Square tubing may also serve as a suitable substrate material for leg segments. In some embodiments, leg segments are solid all the way through. In other embodiments, leg segments are hollow. Although the primary function of the leg segments is to elevate and support the table surface from the ground, the leg segments may also be used in other ways, such as tent poles, cooking sticks, walking sticks and self-defense tools.

Figure 23:
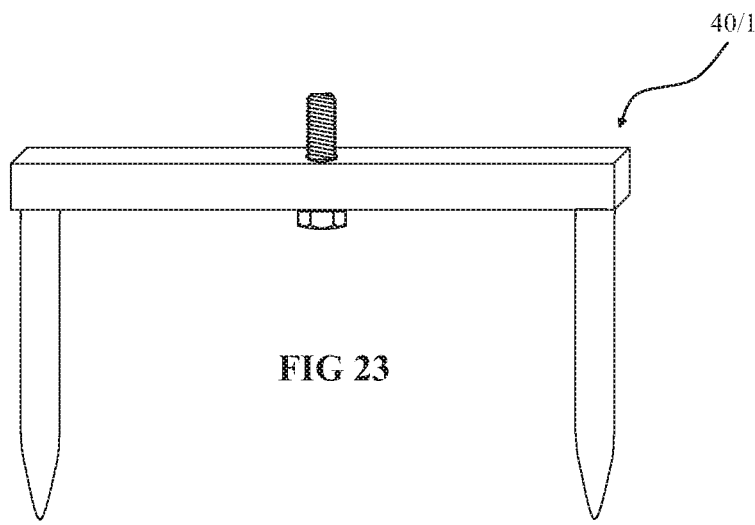
FIG. 23 illustrates perspective view of a ground spike assembly for portable tables disclosed herein.

FIG. 23, illustrates a perspective view of one embodiment of a ground spike assembly 40/1.

Figure 24:
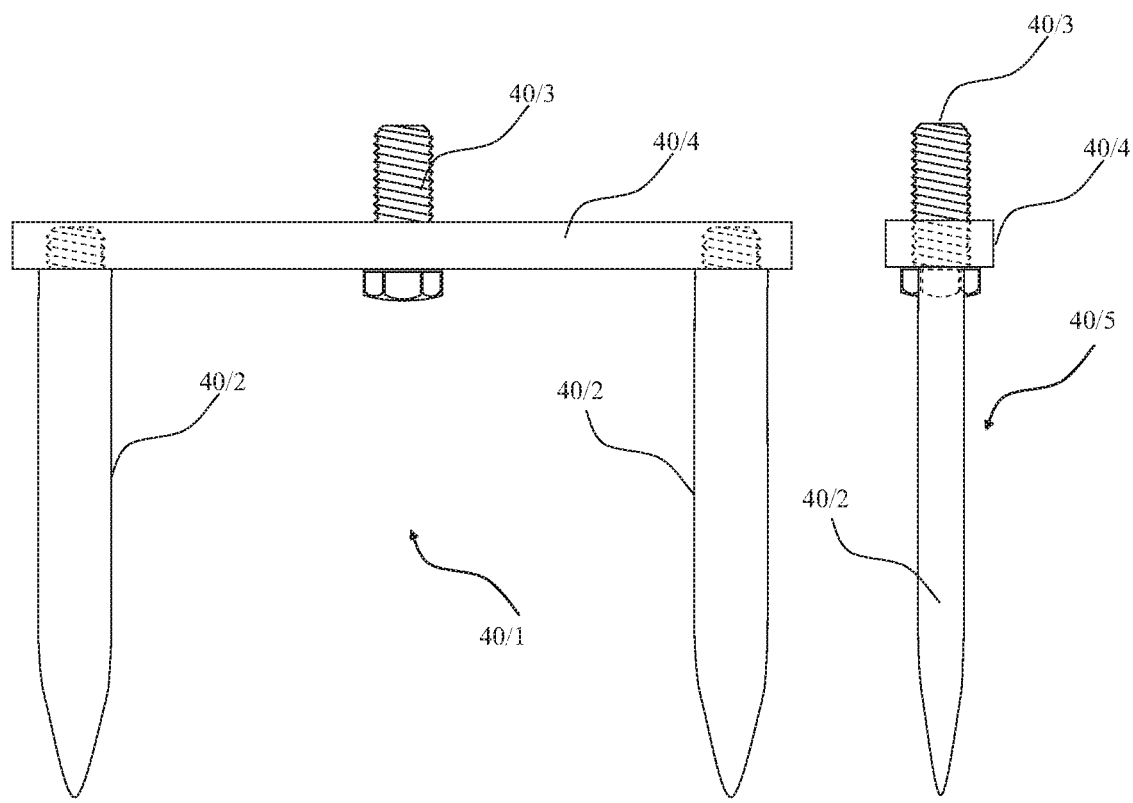
FIG. 24 illustrates design options for ground spike assembly and ground spike for portable tables disclosed herein (front view).

FIG. 24, illustrates a front plan view of a ground spike assembly 40/1. The ground spike assembly 40/1 is configured to be pressed into a soft substrate such as dirt and in so doing keep the table system upright. In one embodiment, a ground spike assembly 40/1 includes a crossbar 40/4, one or more ground spikes 40/2, and a retaining bolt 40/3. The cross bar serves as a support to spread the one or more spikes apart and provide maximum stability to an assembled table system. The ground spike assembly 40/1 comprises one or more ground spikes 40/2 configured with a sharp point at one end and screw threads at an opposite end. In some embodiments, the cross bar 40/4 is configured with an equal number of threaded holes for receiving the threaded end of a ground spike 40/2. Once the ground spike(s) are connected to the crossbar, a retaining bolt 40/3 is inserted through a central hole in the middle of the crossbar and retainingly engaged with the threaded female end of the lowermost leg assembly segment (not shown). In another embodiment, the ground spike assembly includes a single ground spike 40/2. In some embodiments, the pointed end of a ground spike 40/2, may be smooth, while in other embodiments, the point end of a ground spike may be roughened, barbed, serrated, or otherwise textured to prevent said spike from easily pulling out of whatever substrate the spike may be inserted into. The ground spike(s) can be used individually (pole style) or in pairs (fork style). The substrate that the table is being used in will dictate what style of ground spike assembly is necessary to keep the table vertical. Softer substrates will require dual ground spikes, while relatively harder or rockier substrates may require only a pole style ground spike assembly. When used in the fork style ground spike assembly, the ground spike(s) are individually screwed into either end of a cross bar. The cross bar is then screwed into the bottom of either a leg assembly segment or the bottom of the T-bar. When using a pole style ground spike assembly, a ground spike is screwed into the bottom of the leg assembly piece or the bottom of the T-bar to achieve a desired height. A singe ground spike 40/2 can be used with any number of leg assembly pieces 30/1 (not shown) to create a number of additional tools such as a walking stick, a cooking stick, a self-defense tool, or a tent pole to name a few.

In use, the ground spike(s) are pushed into the substrate creating a stable base for attachment to the leg assembly or the T-bar. This process can be accomplished by using the two spike (fork) method or a single spike (pole) method. Either method is easy to use, strong, and allows for maximum portability and adaptability. The ground spike(s) create a stable foundation for the table system even in soft or uneven substrates. In some embodiments, the ground spike(s) uses a male Unified Thread Count that is located at the top of the ground spike(s). The two spikes in the two spike method are attached to the ground spike(s) cross bar. The ground spike(s) cross bar is then attached to either the leg assembly pieces or the T-bar using a male unified thread count bolt.

The Ground Spike assembly may be modified in a number of ways to suit the intended application or manufacturing process. For example, the shape of the points may be varied. It may instead be designed with a solid crossbar that is bent on either end and sharpened to form two downwardly extending spikes. The retaining bolt that holds the ground spike assembly onto the leg assembly and/or the T-bar could be made non-removable or a solid part of the bar that is then turned using a CNC machine. The spikes could alternatively be welded onto the cross bar. Like every other component of the table systems disclosed herein, the ground spikes serve not only to support the table system, but also, for example, as a hunting tool, an anchor spike for shelter, a spike in a walking stick, a self-defense weapon, and a writing instrument for use in survival situations.

Figure 25:
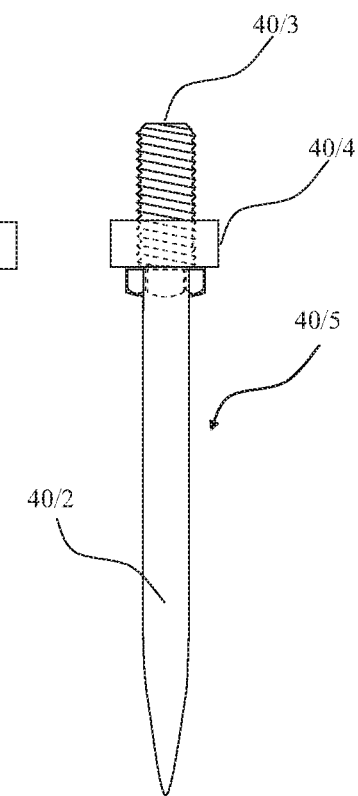
FIG. 25 illustrates design options for ground spike assembly and ground spike for portable tables disclosed herein (side view).

FIG. 25, illustrates a side view 40/5 of the ground spike assembly 40/1 mentioned in FIG. 24.

Figure 26:
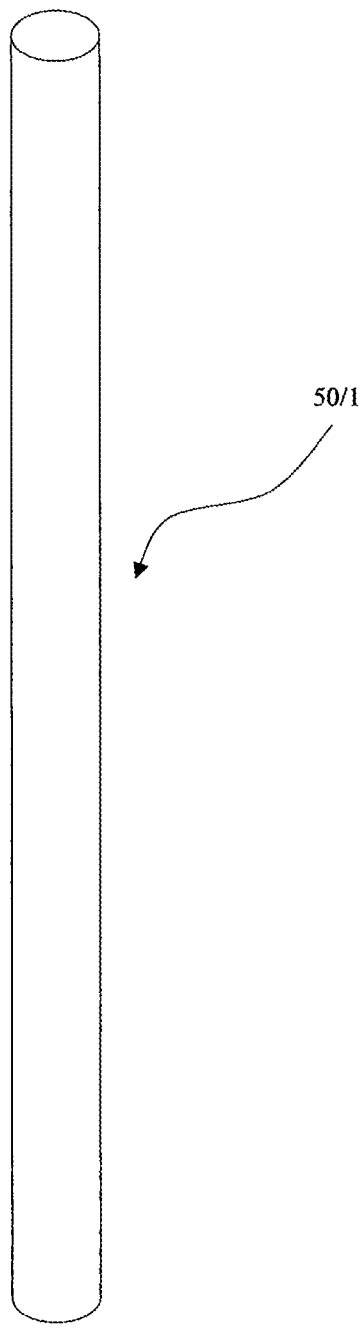
FIG. 26 illustrates perspective view of a support strut for a portable table disclosed herein.

FIG. 26 provides a plan view of a support strut 50/1 for a portable table. In one embodiment, it is a rod-like member that serves to keep the two tabletop sections from bending. These support struts 50/1 are used only when both tabletop sections are deployed. A support strut is not required when using only one half of the tabletop. Support struts are typically made of aluminum for strength and durability, but may be made from any durable material, including plastics and other metals. Each support strut 50/1 is inserted into hole 10/4 (not shown) extending longitudinally through at least a portion of each tabletop section (see FIG. 17). Once a support strut is inserted into one tabletop section, the second tabletop section is placed over the remainder of the support strut extending from the first tabletop section.

Figure 27:
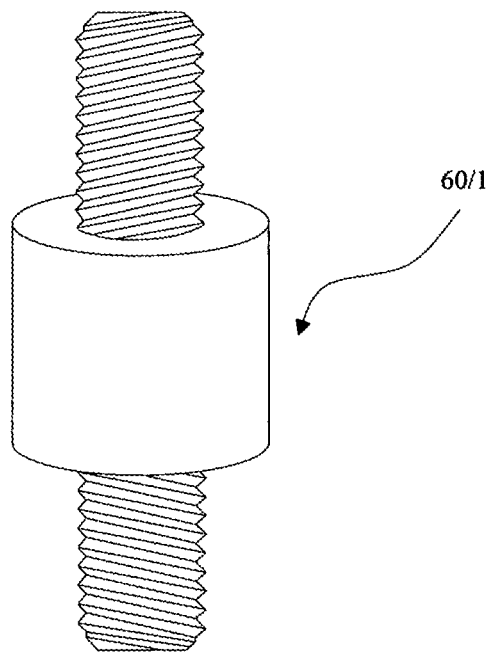
FIG. 27 illustrates perspective view of a box bolt for use with a hard surface box assembly for a portable table disclosed herein.
Figure 33:
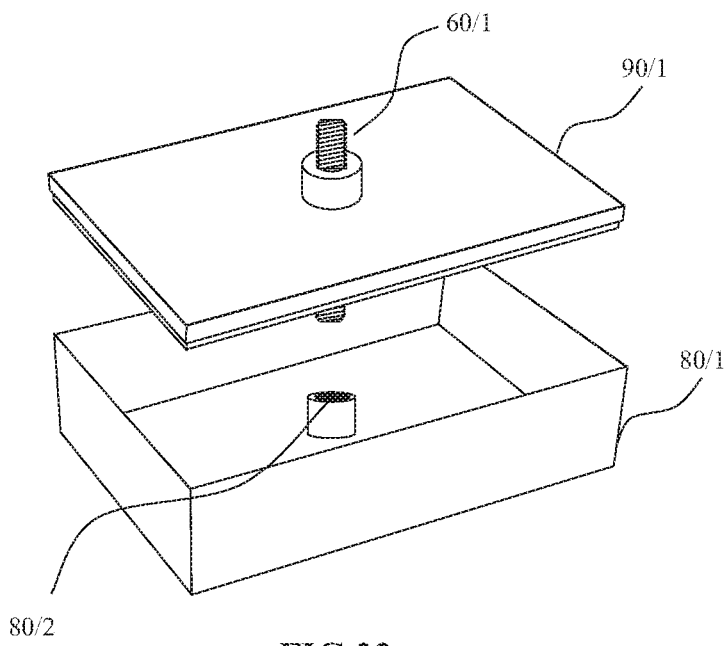
FIG. 33 illustrates perspective view of one embodiment of a hard surface box and lid assembly for a portable table and flip table disclosed herein.
Figure 34:
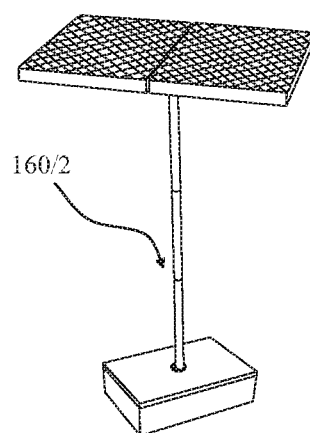
FIG. 34 illustrates perspective view of one embodiment of a hard surface box and lid assembly for a portable table and flip table disclosed herein.

FIG. 27, illustrates a perspective view of one embodiment of a box bolt 60/1 used to connect a leg assembly segment to a hard surface box and lid assembly (see FIG. 33 and FIG. 34).

Figure 28:
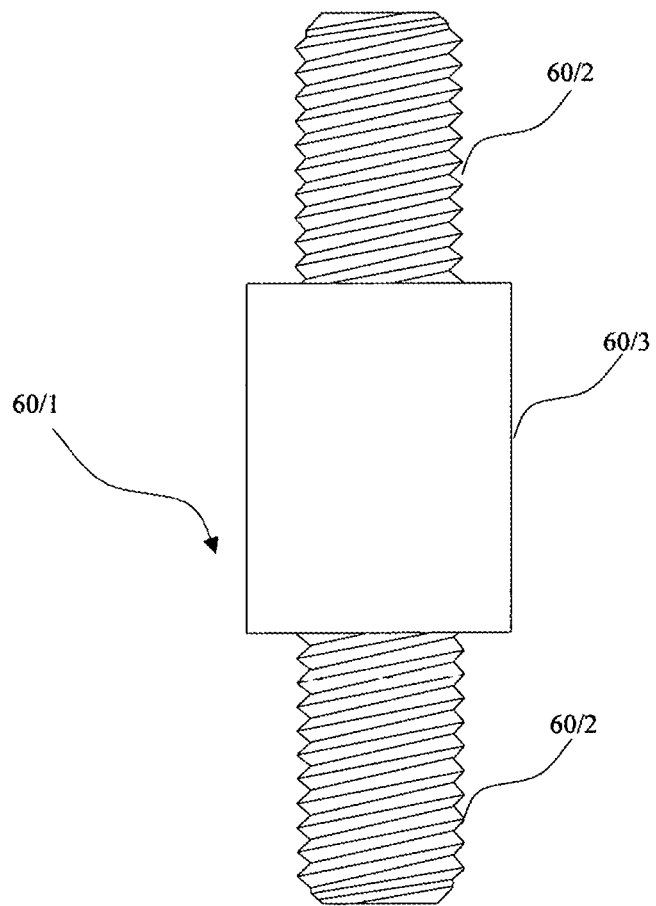
FIG. 28 illustrates design options for a box bolt for use with a hard surface box assembly for a portable table disclosed herein.

FIG. 28, provides a plan view of one embodiment of a box bolt 60/1 used to connect a leg assembly segment to a hard surface box and lid assembly (see FIG. 33 and FIG. 34). The box bolt has male threads 60/2 on either end of a smooth body portion 60/3. The male threads are consistent with other male threaded portions of the table system and work in conjunction with other threaded female components. Once material has been placed in the bottom of the hard surface box, the lid is then placed on the top of the box. The threaded bolt is screwed into a hole through the lid and into the base of the hard surface box connecting the lid onto the box. The male threads on the bolt are now facing upwards from the top of the lid and will now allow for the female end of a leg assembly piece to be attached. A female threaded end of a leg assembly piece is then screwed onto the upwardly extending threaded male end of the box bolt. The box bolt holds the lid on the hard surface box. The box bolt allows a user to easily and quickly switch between using a table system with a ground spike assembly on uneven but penetrable, soft terrain and a hard surface box assembly for hard flat terrain or indoors. The table need not be fully disassembled to make this transition.

Figure 29:
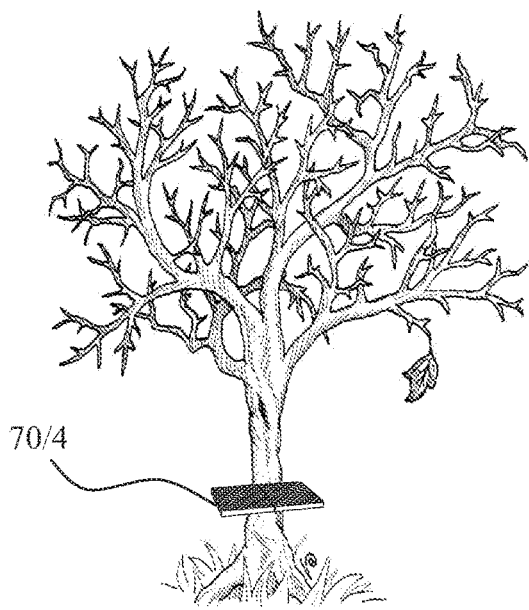
FIG. 29 illustrates perspective view of a tree screw for a portable table disclosed herein.

FIG. 29, illustrates a front perspective view of one embodiment of a tree screw in use 70/4.

Figure 30:
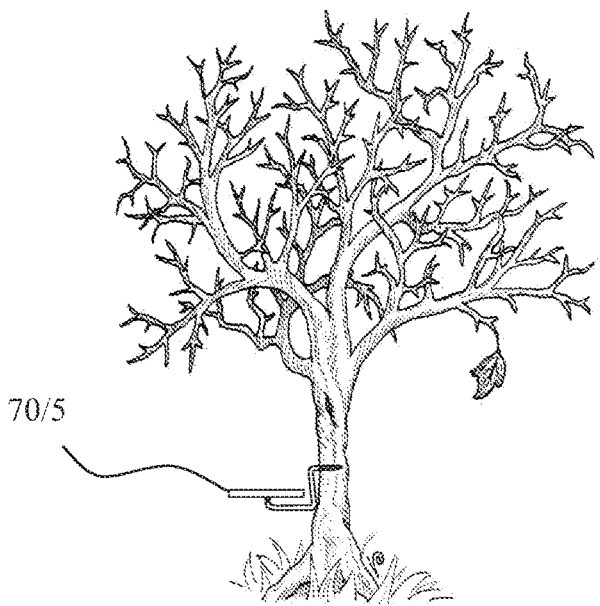
FIG. 30 illustrates perspective view of a tree screw for a portable table disclosed herein.

FIG. 30, illustrates a side perspective view of one embodiment of a tree screw in use 70/5.

Figure 31:
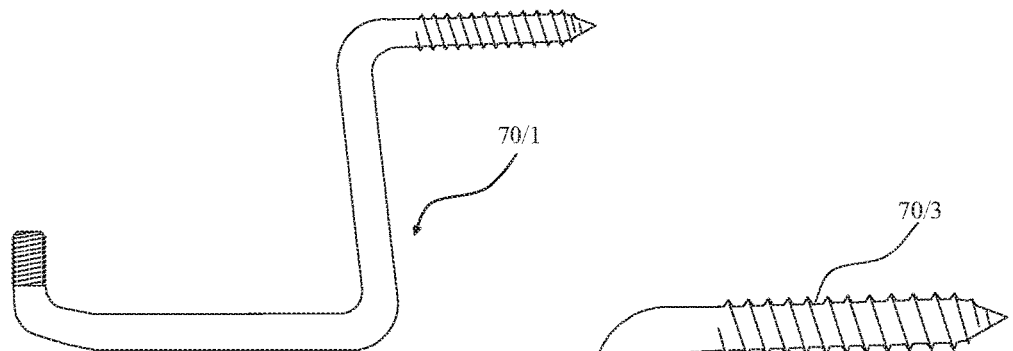
FIG. 31 illustrates design options for a tree screw for a portable table disclosed herein.

FIG. 31, provides a plan view of a tree screw used with the portable table system described herein 70/1.

Figure 32:
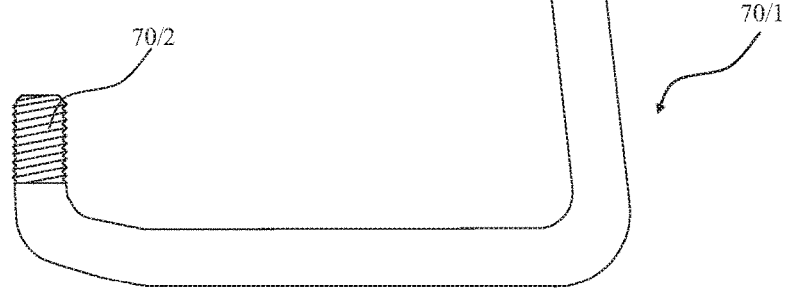
FIG. 32 illustrates design options for a tree screw for a portable table disclosed herein.

FIG. 32, illustrates a tree screw 70/1 for use with a portable fixed-top or flip-top table system. The tree screw is designed to screw into any wooden substance, including trees. The tree spike comprises a pointed end a blunt end. The pointed end is configured with self-tapping screw threads 70/3 designed to be screwed into a tree or other wooden substrate. The blunt end of the tree spike is threaded with screw threads 70/2 complimentary to the threads inside the hole in the bottom side of the T-Bar (not shown). The tree screw 70/1 is designed to be an alternative to the ground spike assembly and hard surface box assembly.

In use, the tree screw is first attached to a suitable wooden substrate. The T-bar (not shown) is then screwed onto the threaded blunt end 70/2. Then, one or both halves of the tabletop may be attached to the arms of the T-bar. The tree screw 70/1 allows a user to deploy the table system onto vertical objects and trees which would otherwise not be capable of supporting a table. When not being used as a support for a table system, the tree spike also offers users many of the same features of the ground spike, such as a hunting tool, anchor spike, defensive weapon, writing tool, or hanger.

FIG. 33, provides a perspective view of one embodiment of a hard surface box and lid assembly for a portable table disclosed herein. The hard surface box bottom 80/1 can be filled with rock, sand, dirt, water or any other readily available material that can be used to weight the box to the ground and give the box stability. The hard surface box bottom 80/1 is filled with suitable weighting material(s). The hard surface box lid 90/1 is then placed on top of the bottom of the box and the box bolt 60/1 is engaged with female threaded hole 80/2. Now one or more leg assembly segments are connected to the upwardly protruding male threaded end of the box bolt, and the tabletop sections are assembled thereon as shown in FIG. 34. Alternatively, the box bolt may be attached to the T-bar. The hard surface box and lid assembly also doubles as the carrying case for the other components of the table system. This minimizes the overall size of the dissembled table system, reduces the manufacturing costs, and makes the table system more portable and adaptable.

The hard surface box and lid assembly allow a user to deploy the table system on terrain and ground conditions that are not suitable for use with a ground spike assembly, such as concrete, flat rock, tent floors, truck beds, and indoors. The hard surface box and lid assembly will support the table system on any surface but works best on a hard or flat surface where ground spike(s) will not or should not penetrate the substrate. When not in use, the hard surface box and lid assembly can serve as a storage container for food, tools, medical supplies, firewood, and other items.

FIG. 34, illustrates a perspective view of the portable table system being used with the hard surface box and lid 160/3.

Figure 35:
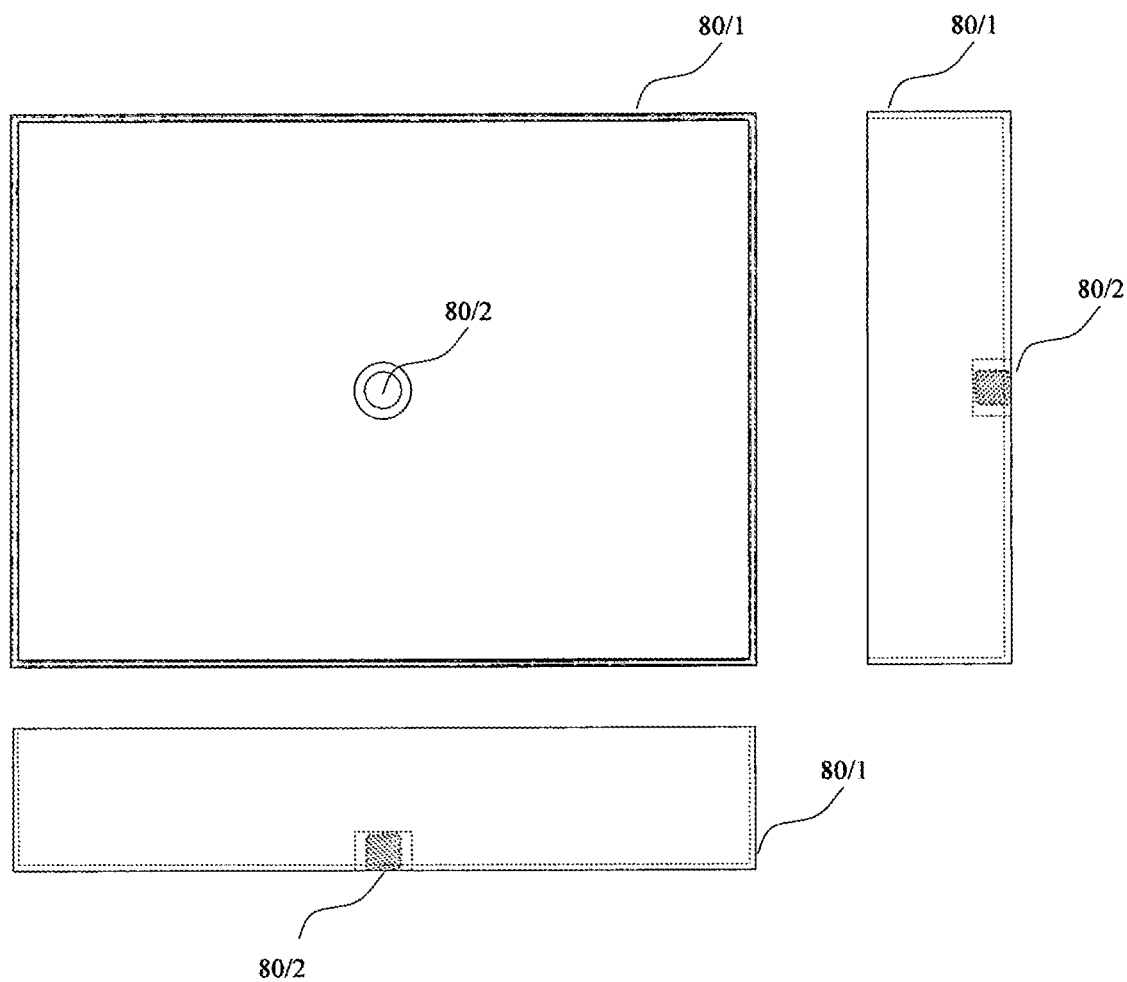
FIG. 35 illustrates design options for an embodiment of a hard surface box for a portable tables disclosed herein.

FIG. 35, provides a multiple views of one embodiment of a hard surface box for a portable table disclosed herein. The hard surface box bottom 80/1 can be filled with rock, sand, dirt, water or any other readily available material that can be used to weight the box to the ground and give the box stability. The hard surface box bottom 80/1 is filled with suitable weighting material(s). The hard surface box lid 90/1 (see FIG. 36 and FIG. 33) is then placed on top of the bottom of the box and the box bolt is engaged with female threaded hole 80/2. Now one or more leg assembly segments are connected to the upwardly protruding male threaded end of the box bolt, and the tabletop sections are assembled thereon as shown in FIG. 34. Alternatively, the box bolt may be attached to the T-bar. The hard surface box and lid assembly also doubles as the carrying case for the other components of the table system. This minimizes the overall size of the dissembled table system, reduces the manufacturing costs, and makes the table system more portable and adaptable.

The hard surface box and lid assembly allow a user to deploy the table system on terrain and ground conditions that are not suitable for use with a ground spike assembly, such as concrete, flat rock, tent floors, truck beds, and indoors. The hard surface box and lid assembly will support the table system on any surface but works best on a hard or flat surface where ground spike(s) will not or should not penetrate the substrate. When not in use, the hard surface box and lid assembly can serve as a storage container for food, tools, medical supplies, firewood, and other items.

Figure 36:
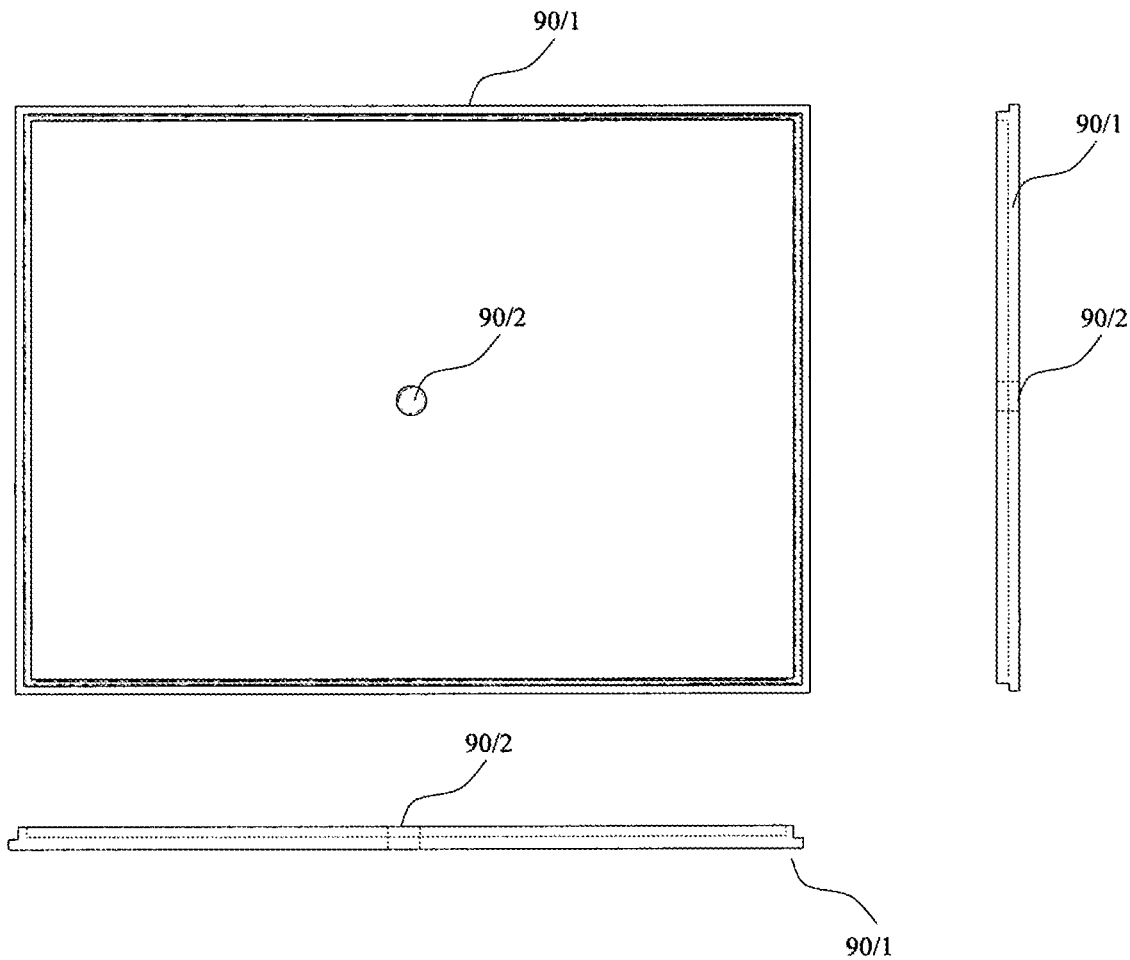
FIG. 36 illustrates design options for an embodiment of a hard surface lid for a portable tables disclosed herein.

FIG. 36 provides a multiple views of one embodiment of a hard surface box lid for a portable table disclosed herein. The hard surface box lid 90/1 (see FIG. 36 and FIG. 33) is placed on top of the bottom of the box and the box bolt is engaged with female hole 90/2 and screwed into female threaded hole on box. Now one or more leg assembly segments are connected to the upwardly protruding male threaded end of the box bolt, and the tabletop sections are assembled thereon as shown in FIG. 34. Alternatively, the box bolt may be attached to the T-bar. The hard surface box and lid assembly also doubles as the carrying case for the other components of the table system. This minimizes the overall size of the dissembled table system, reduces the manufacturing costs, and makes the table system more portable and adaptable.

The hard surface box and lid assembly allow a user to deploy the table system on terrain and ground conditions that are not suitable for use with a ground spike assembly, such as concrete, flat rock, tent floors, truck beds, and indoors. The hard surface box and lid assembly will support the table system on any surface but works best on a hard or flat surface where ground spike(s) will not or should not penetrate the substrate. When not in use, the hard surface box and lid assembly can serve as a storage container for food, tools, medical supplies, firewood, and other items.

Figure 37:
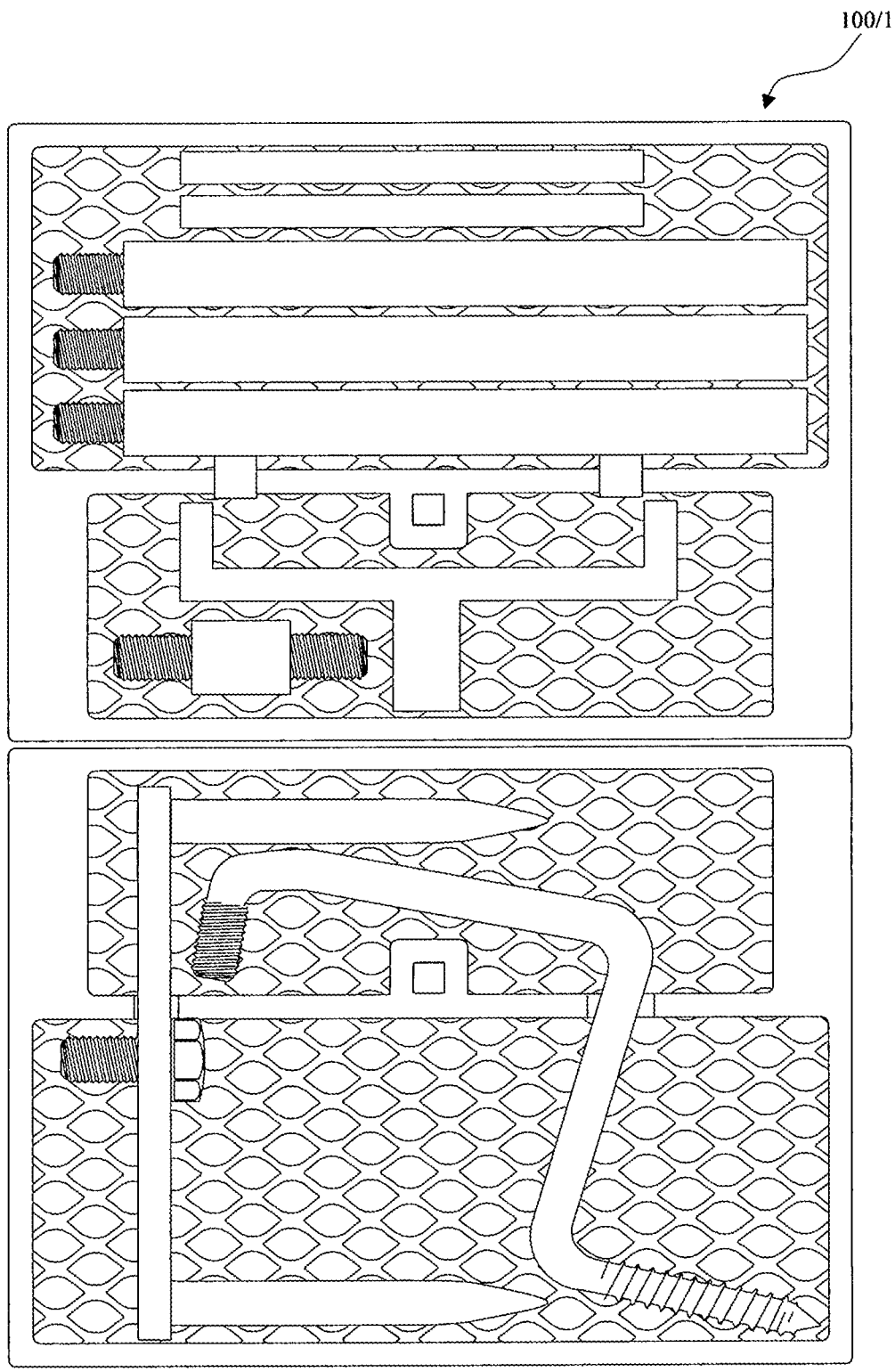
FIG. 37 illustrates a packaging layout for the components of a portable table disclosed herein nested inside two tabletop sections.

FIG. 37, illustrates one embodiment of a packaging layout for stowing the components of a the table systems disclosed herein. As is shown, the various components of the table system nest inside the two table top sections, which serve as a storage and transport container. Once combined, they may be placed in a suitable formfitting container, such as a zippered nylon bag, or the hard surface box and lid assembly. This design is ergonomic and does not add weight or bulk to the product, and reduces costs of manufacturing. This design also prevents users from losing parts because it creates a physical checklist of items that should be present when stowing the components of the table system. It will help eliminate the possibility of leaving pieces behind by giving a user a visual clue that a piece is missing.

FIG. 38, provides a perspective view of one embodiment of a T-bar 20/1 and tab 110/1 for a portable rotatable flip-top table system or a fixed-top table system.

FIG. 39, illustrates a plan view of another embodiment of a T-bar 20/1 and tab 110/1 for a portable rotatable flip-top table system or a fixed-top table system. The T-bar 20/1 comprises a cross bar with two fingers extending upwardly 20/3 and perpendicular there from. Protruding perpendicularly (i.e., latitudinal) from each finger is a tab 110/1 designed to lock into a hinge attached to a tabletop section (not shown). This arrangement allows the tabletop to swivel from a horizontal or flat deployed position to a vertical stowed position as shown in FIG. 8.

FIG. 40, illustrates a top view of another embodiment of a T-bar 20/1 and tab 110/1 for a portable rotatable flip-top table system or a fixed-top table system. The T-bar 20/1 comprises a cross bar with two fingers extending upwardly 20/3 and perpendicular there from. Protruding perpendicularly (i.e., latitudinal) from each finger is a tab 110/1 designed to lock into a hinge attached to a tabletop section (not shown). This arrangement allows the tabletop to swivel from a horizontal or flat deployed position to a vertical stowed position as shown in FIG. 8.

FIG. 41, illustrates a bottom view of another embodiment of a T-bar 20/1 and tab 110/1 for a portable rotatable flip-top table system or a fixed-top table system. The T-bar 20/1 comprises a cross bar with two fingers extending upwardly 20/3 and perpendicular there from. Protruding perpendicularly (i.e., latitudinal) from each finger is a tab 110/1 designed to lock into a hinge attached to a tabletop section (not shown). This arrangement allows the tabletop to swivel from a horizontal or flat deployed position to a vertical stowed position as shown in FIG. 8.

FIG. 42, illustrates the hinge 120/1 in the flat table top 10/1 and locked position on tab 110/1 for the portable rotatable flip-top.

FIG. 43, illustrates the hinge 120/1 in the stowed table top 10/1 position on the tab 110/1 for the portable rotatable flip-top.

FIG. 44, illustrates the removing the table top 10/1 from the hinge 120/1 from the tab 110/1 for the portable rotatable flip-top.

FIG. 45, illustrates the plan view of the hinge 120/1 for the portable rotatable flip-top table. The hinge is the source of the tabletop's ability to swivel. The tabletop section comprises two downwardly protruding hinges on the bottom of the table top 10/1 as shown in the FIG. 5 and FIG. 6. Each hinge 120/1 comprises of a tab receiver slot 120/3, a tab hole 120/4, and a tab lock slot 120/2. Once the hinge on the bottom of the flip-top table is slid downward onto the tab 110/1, the table can rotate on the tab hole 120/4 or be locked into the tab slot 120/2. Additionally the hinge comprises of a slot 120/4 on the bottom of the tab hole allowing for the removal of the table top. When the tab on the T-bar is placed in the slot 120/2 in each hinge, the table will be locked in a deployed position. The table surface may be stowed by simply lifting upward on the table surface such that the tabs 110/1 disengage from the slots 120/2 in each hinge. The table surface and hinge may then rotate about the tabs 110/1 to a stowed position as shown in FIG. 43 respectively. Additionally, the table top can be removed as shown in FIG. 44.

Figure 46:
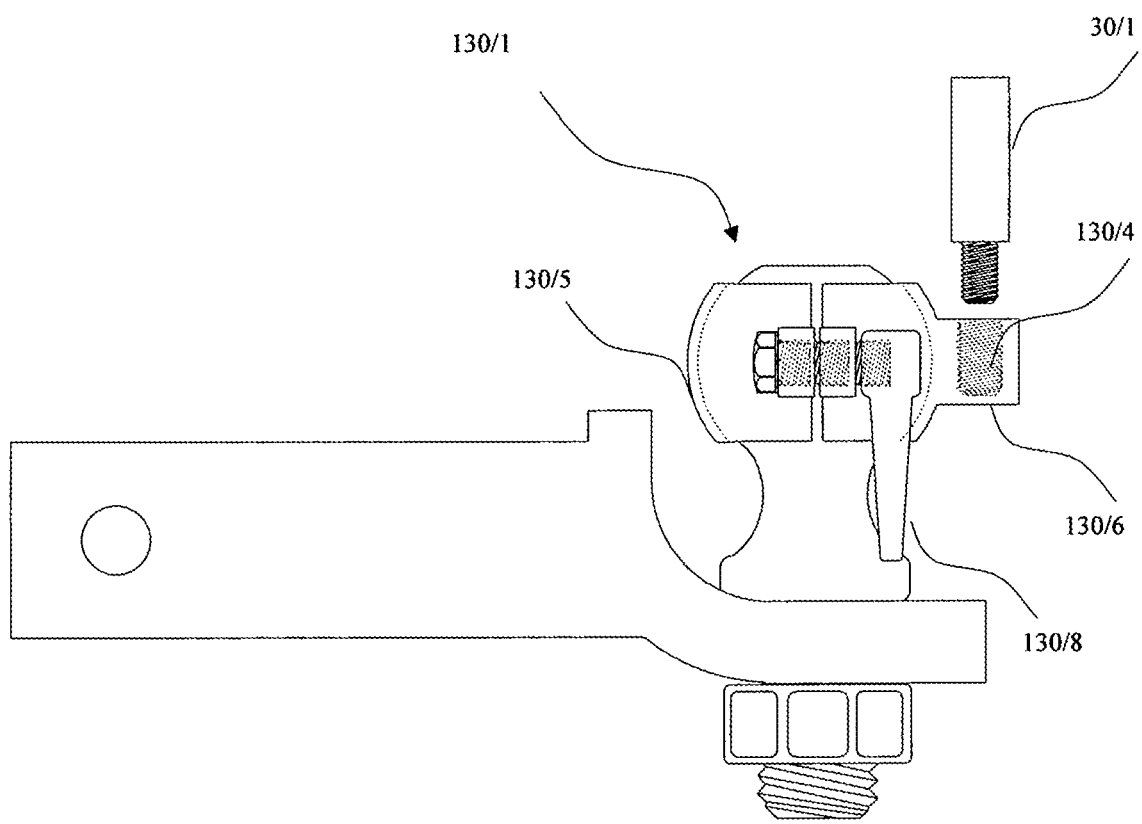
FIG. 46 illustrates design options for a ball hitch adaptor for a portable table disclosed herein.

FIG. 46 illustrates a plan view and design options for a ball hitch adaptor for a portable table system. The ball hitch adapter 130/1 allows a user to attach a table system to the hitch of a vehicle. The ball hitch adapter clamps onto the ball portion of the hitch. Once attached, the user will loosen the clamp 130/8, adjust the table to its upright and flat position and then tighten the clamp 130/8 around the ball. The ball hitch adapter will keep the surface of the table flat regardless of how angled the vehicle is. In use, the ball hitch adapter 130/1 is attached to the ball of a vehicle. The male threaded end of the leg assembly 30/1 is screwed into the female threaded receiver hole 130/4 of the ball adapter. Once attached, a user need only loosen the tightening arm 130/8, adjust the table to its deployed and flat position, and re-tighten the arm 130/8. See perspective view of ball hitch adaptor in FIG. 47.

Figure 47:
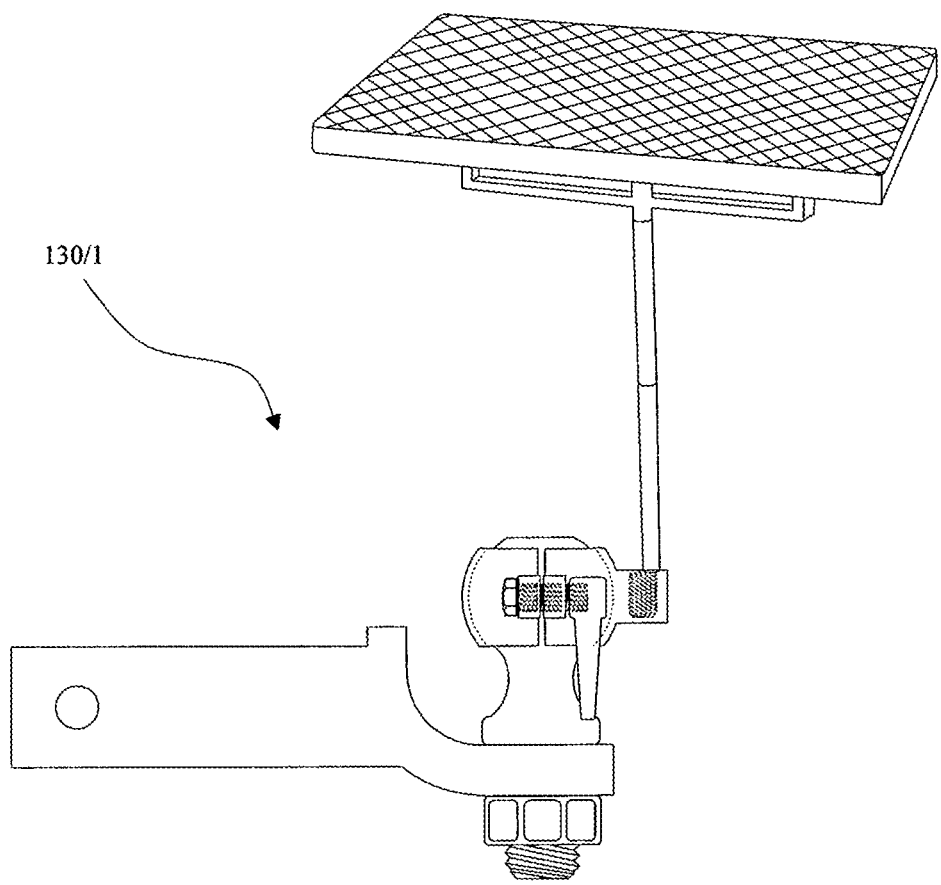
FIG. 47 illustrates perspective view of a ball hitch adaptor for a portable table disclosed herein.

FIG. 47 illustrates a perspective view of the ball hitch adaptor with the table system attached.

Figure 48:
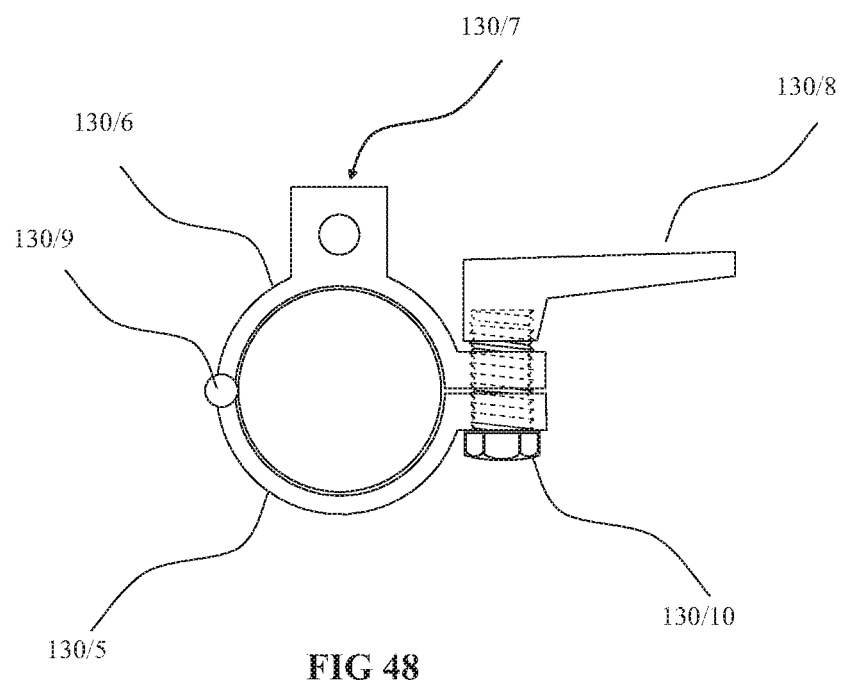
FIG. 48 illustrates design options for a ball hitch adaptor for a portable table disclosed herein (top view).

FIG. 48, illustrates the top view and components to the ball hitch adaptor. After loosening the clamp 130/8 and sliding the bolt 130/10 and the clamp 130/8 out from the bolt slot, the two outer cups 130/5 and 130/6 will pivot on the hinge 130/9 allowing the ball hitch adaptor to be opened and wrapped around the ball of the hitch. Once closed around the ball, replace the bolt 130/10 and the clamp 130/8 and tighten slightly to keep closed around the ball. Screw a leg assembly piece (not shown) into the female hole 130/7. Finally, loosen the clamp 130/8, position the leg assembly piece so it is pointing straight upwards and re-tighten the clamp 130/8. The T-bar (not shown) can then be screwed onto the leg assembly piece. Once the T-bar is attached, the table system can be attached as well. The ball hitch adaptor allows for a flat surface anywhere you have a ball hitch. This further illustrates the functionality of the modular, portable table system.

Figure 49:
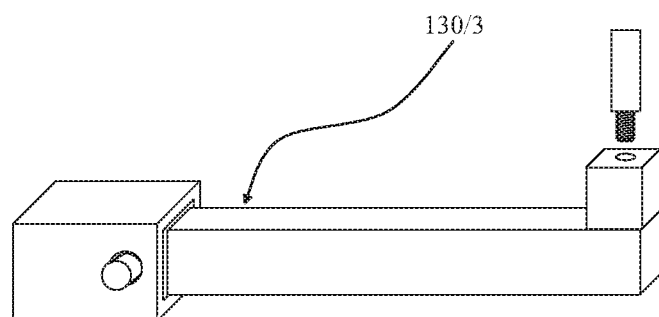
FIG. 49 illustrates another embodiment and design options for a ball hitch adaptor for a portable table disclosed herein.

FIG. 49, provides another design option of the ball hitch adaptor that does not use the ball portion of the hitch. This design uses the receiver on the hitch to hold the adaptor.

Figures 50, 51:
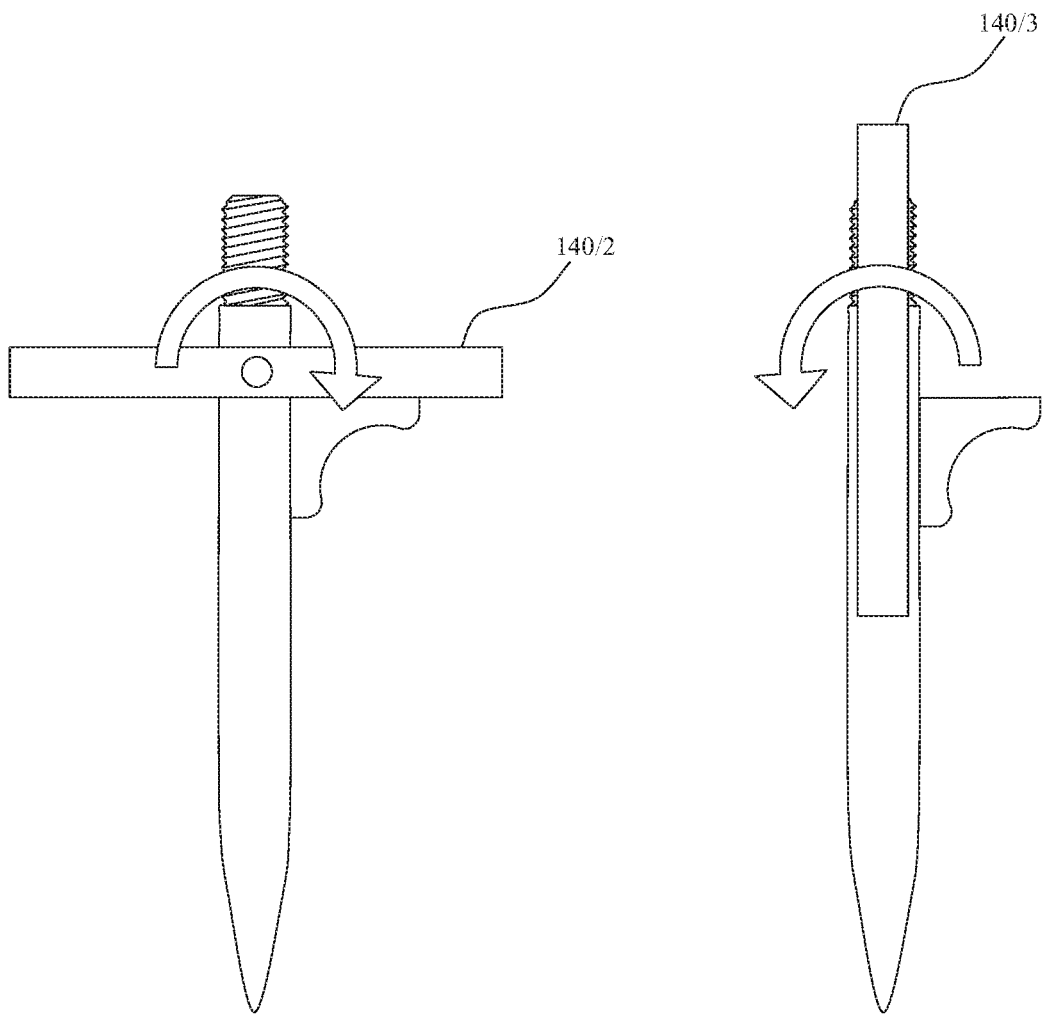
FIG. 50 illustrates another embodiment of a ground spike for a portable table disclosed herein.
FIG. 51 illustrates another embodiment of a ground spike for a portable tabledisclosed herein.

FIG. 50 illustrates another embodiment for the ground spike. The embodiment shown comprises a rotatable lever 140/2 for a user to use when inserting ground spikes into a substrate. For example, the lever is rotated from position 140/3 to a position horizontal 140/2 to the ground to allow a user to apply foot pressure to the lever, and thus press the spike into the ground more easily. The lever will also prevent the spike from sinking too far in a soft substrate like sand.

FIG. 51, illustrates the stowed position of the ground spike in this design.

FIG. 52, illustrates an additional embodiment for a leg assembly. A pin mechanism is used to lock leg height for table.

FIG. 53, illustrates yet another embodiment for a leg assembly. A pull tab mechanism is used to lock leg height for table.

INTERPRETATION

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing an invention (especially in the context of the following claims) are to be construed to cover both the singular and the plural, unless otherwise indicated herein or clearly contradicted by context. The terms "comprising," "having," "including," and "containing" are to be construed as open-ended terms (i.e., "including, but not limited to,") unless otherwise noted. Recitation of ranges as values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention (i.e., "such as, but not limited to,") unless otherwise claimed. No language in the specification should be construed as indicating any non-claimed element as essential to the practice of the invention.

While the disclosure above sets forth the principles of the invention disclosed herein, with examples given for illustration only, those skilled in the art will appreciate from the foregoing that various adaptations and modifications of the just described embodiments can be configured in various respects without departing from the scope and sprit of the invention. The inventors expect that skilled artisans will employ various obvious changes in form and detail, and the inventors intend for the invention to be practiced other than as specifically described herein. Accordingly, the invention includes all equivalents and usual and obvious modifications of the subject matter recited in the claims appended hereto as permitted by applicable law. Moreover, any combination of the above-described features and elements in all possible variations hereof is encompassed by the invention unless otherwise indicated herein or otherwise clearly contradicted by context. Therefore, it is to be understood that the invention must be measured by the scope of the appended claims and not by the description of the examples or the preferred embodiments.

What is claimed is:

1. A modular portable table, comprising:
   a T-bar support brace including two oppositely extending bracing arms protruding from a central trunk, each bracing arm having an upwardly extending finger, each finger having a vertically oriented tab with flat sides extending laterally inward from the finger over a portion of each corresponding bracing arm toward the tab of the opposite finger;
   a tabletop section including an upper surface, a lower surface, and a pair of hinges extending downward from the lower surface of the tabletop section, the hinges spaced apart by a first distance greater than a second distance defined between the tabs, wherein each hinge includes a substantially flat body through which is defined:
      a circular hole sized to receive and permit rotation while received therein of a corresponding tab of the pair of tabs,
      a first linear slot through which the corresponding tab is slidably receivable, the first linear slot extending from a lowermost edge of the body to a lowermost edge of the hole, and
      a second linear slot in which the corresponding tab is slidably receivable, the second linear slot extending from an uppermost edge of the hole toward an uppermost edge of the hinge, wherein the second linear slot is vertically aligned with the first linear slot;
   an anchor assembly for anchoring the table to a substrate; and
   a leg assembly for releasably connecting the anchor assembly to the T-bar support brace, the leg assembly including a plurality of inter-connectable leg assembly pieces;
   wherein the tabletop section is selectably moveable between:
      a deployed position wherein each tab of the T-bar support brace is received in the second linear slot of a corresponding hinge to lock the tabletop section in a horizontal orientation atop the T-bar support brace, and
      a stowed position wherein each tab of the T-bar support brace is received in the hole of the corresponding hinge and the tabletop section is rotated about the tabs so that it rests alongside the T-bar support brace.

2. A modular portable table, consisting of:
   a T-bar support brace including two oppositely extending bracing arms protruding from a central trunk, each bracing arm having an upwardly extending finger, each finger having a vertically oriented tab with flat sides extending laterally inward from the finger over a portion of each corresponding bracing arm toward the tab of the opposite finger;
   a tabletop section including an upper surface, a lower surface, and a pair of hinges extending downward from the lower surface of the tabletop section, the hinges spaced apart by a first distance greater than a second distance defined between the tabs, wherein each hinge includes a plate through which is defined:
      a circular hole sized to receive and permit rotation while received therein of a corresponding tab of the pair of tabs,
      a first linear slot through which the corresponding tab is slidably receivable, the first linear slot extending from a lowermost rounded edge of the body to a lowermost edge of the hole, and
      a second linear slot in which the corresponding tab is slidably receivable, the second linear slot extending from an uppermost edge of the hole toward an uppermost edge of the hinge, wherein the second linear slot is vertically aligned with the first linear slot;
   an anchor assembly for anchoring the table to a substrate; and
   a leg assembly for releasably connecting the anchor assembly to the T-bar support brace, the leg assembly including a plurality of inter-connectable leg assembly pieces;
   wherein the tabletop section is selectably moveable between:
      a deployed position wherein each tab of the T-bar support brace is received in the second linear slot of a corresponding hinge to lock the tabletop section in a perpendicular orientation relative to the T-bar support brace,
      a stowed position wherein each tab of the T-bar support brace is received in the hole of the corresponding hinge and the tabletop section is rotated about the tabs so that it rests substantially parallel to the T-bar support brace, and
      a release position wherein each tab of the T-bar support brace is withdrawn from the first linear slot of the corresponding hinge to release the tabletop section from the T-bar support brace.

* * * * *